United States Patent
Tanaka et al.

(10) Patent No.: US 10,172,056 B2
(45) Date of Patent: Jan. 1, 2019

(54) MOBILE COMMUNICATION SYSTEM, NETWORK NODE, AND MOBILE COMMUNICATION METHOD

(71) Applicant: NTT DOCOMO, INC., Tokyo (JP)

(72) Inventors: Itsuma Tanaka, Tokyo (JP); Daisuke Fujishima, Tokyo (JP); Keisuke Suzuki, Tokyo (JP); Zhen Miao, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 15 days.

(21) Appl. No.: 15/021,043

(22) PCT Filed: Sep. 11, 2014

(86) PCT No.: PCT/JP2014/074041
§ 371 (c)(1),
(2) Date: Mar. 10, 2016

(87) PCT Pub. No.: WO2015/037650
PCT Pub. Date: Mar. 19, 2015

(65) Prior Publication Data
US 2016/0227457 A1    Aug. 4, 2016

(30) Foreign Application Priority Data
Sep. 13, 2013 (JP) .................... 2013-190542

(51) Int. Cl.
*H04W 8/06* (2009.01)
*H04W 8/04* (2009.01)
(Continued)

(52) U.S. Cl.
CPC ............. *H04W 36/14* (2013.01); *H04W 8/04* (2013.01); *H04W 8/065* (2013.01); *H04W 8/08* (2013.01); *H04W 72/10* (2013.01)

(58) Field of Classification Search
CPC ....... H04W 36/14; H04W 72/10; H04W 8/08; H04W 8/065; H04W 8/04
See application file for complete search history.

(56) References Cited

U.S. PATENT DOCUMENTS

| 2012/0196599 A1* | 8/2012 | Cho | ........................ H04W 8/04 455/435.1 |
|---|---|---|---|
| 2013/0083765 A1 | 4/2013 | Ai | |

(Continued)

FOREIGN PATENT DOCUMENTS

| EP | 2763496 A1 | 8/2014 |
|---|---|---|
| WO | 2013/006219 A1 | 1/2013 |
| WO | 2015003753 A1 | 1/2015 |

OTHER PUBLICATIONS

Search Report issued in the counterpart European Patent Application No. 14844061.3, dated Jul. 8, 2016 (11 pages).
(Continued)

*Primary Examiner* — Ajit Patel
(74) *Attorney, Agent, or Firm* — Osha Liang LLP

(57) ABSTRACT

The invention provides a mobile communication system, a network node, and a mobile communication method, which can cause user equipment of a particular type to attach to a dedicated network regardless of whether or not the user equipment supports a low access priority indicator (LAPI). An MME (60) acquires subscriber information on UE (10) from an HSS (70) based on an attachment request from the UE (10) forwarded by an eNB (50), the subscriber information including availability for the UE (10) to use the dedicated network, and sends the eNB (50) a selection instruction to select the dedicated network based on the acquired subscriber information. When the eNB (50) receives the selection instruction from the MME (60), the eNB (50) determines a dedicated MME (60D) constituting
(Continued)

the dedicated network, and transmits the attachment request from the UE (10) to the determined dedicated MME (60D).

5 Claims, 20 Drawing Sheets

(51) Int. Cl.
*H04W 36/14* (2009.01)
*H04W 8/08* (2009.01)
*H04W 72/10* (2009.01)

(56) References Cited

U.S. PATENT DOCUMENTS

2013/0303166 A1* 11/2013 Jain .................... H04W 76/048
455/435.2
2014/0341109 A1* 11/2014 Cartmell ............... H04L 45/308
370/328

OTHER PUBLICATIONS

NTT Docomo; "Use of Low Access Priority Indication to select MME"; 3GPP Draft; SA WG2 Meeting #97, S2-131858; Busan, South Korea; May 27-31, 2013 (4 pages).

Nokia Siemens Networks et al.; "Analysis on sending the MTC Indicator to the network in Release 10"; 3GPP TSG SA WG2 Metting #82, TD S2-105744; Jacksonville, Florida; Nov. 15-19, 2010 (4 pages).
3GPP TSG-SA WG1 Meeting #61, S1-131277; "3rd Generation Partnership Project; Technical Specification Group Services and System Aspects; Study on Enhancements for MTC; (Release 12)"; Prague, Czech Republic; Jan. 28-Feb. 1, 2013 (23 pages).
International Search Report issued in PCT/JP2014/074041 dated Nov. 18, 2014 (1 page).
Written Opinion of the International Searching Authority issued in PCT/JP2014/074041 dated Nov. 18, 2014 (3 pages).
Huawei, China Mobile; "Load balancing and overload handling"; 3GPP TSG SA WG2 Meeting #64, S2-082208; Jeju, Korea; Apr. 7-11, 2008 (2 pages).
3GPP TS 23.401 V12.1.0; "3rd Generation Partnership Project; Technical Specification Group Services and System Aspects; General Packet Radio Service (GPRS) enhancements for Evolved Universal Terrestrial Radio Access Network (E-UTRAN) access (Release 12)"; Jun. 2013 (291 pages).
3GPP TS 23.060 V12.1.0; "3rd Generation Partnership Project; Technical Specification Group Services and System Aspects; General Packet Radio Service (GPRS) Service description; Stage 2 (Release 12)"; Jun. 2013 (338 pages).

\* cited by examiner

FIG. 9
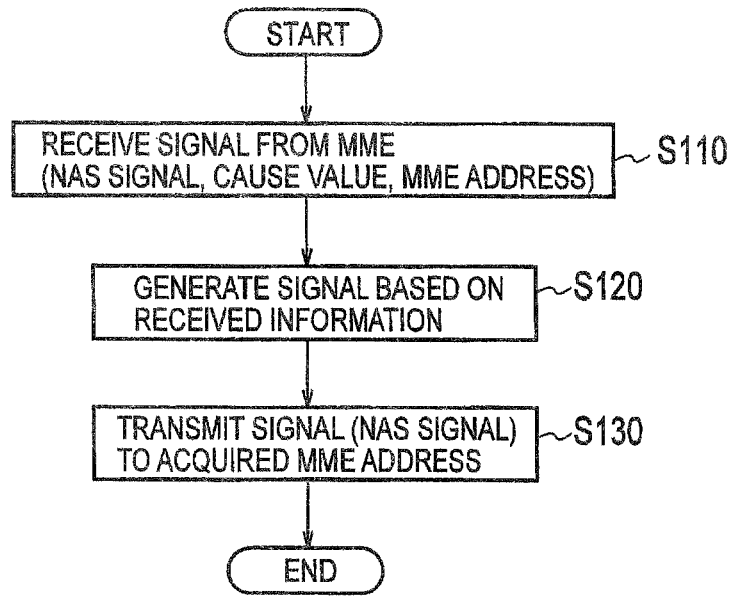
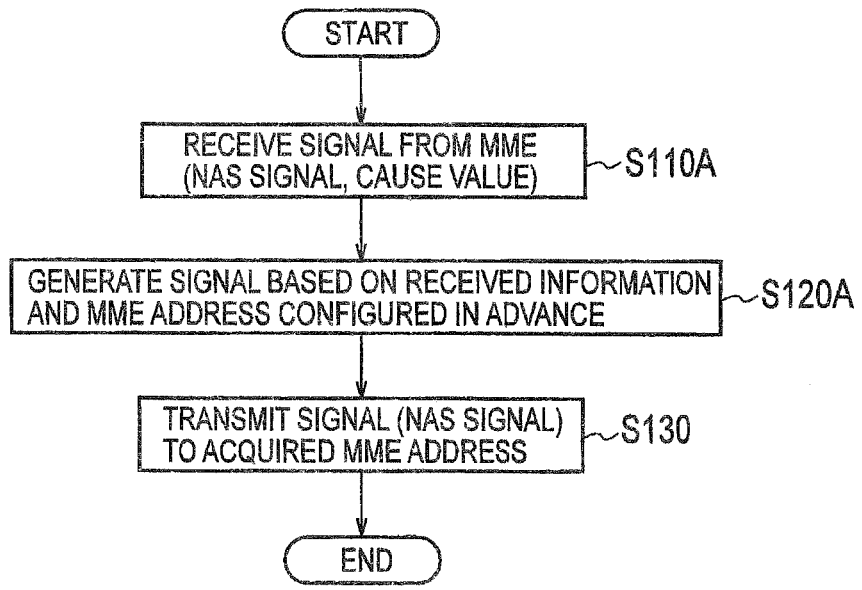

FIG. 10
(a)
MME ADDRESS PRESENT
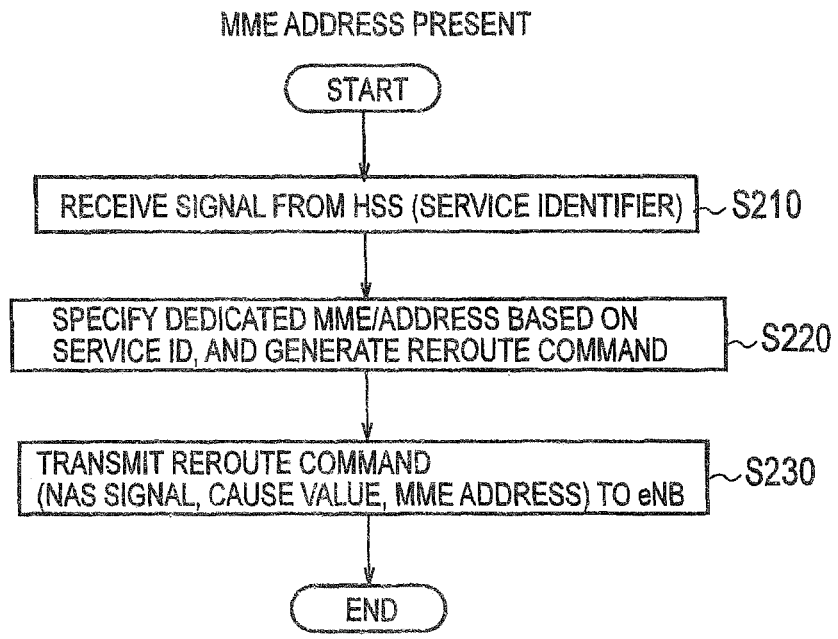
(b)
MME ADDRESS ABSENT
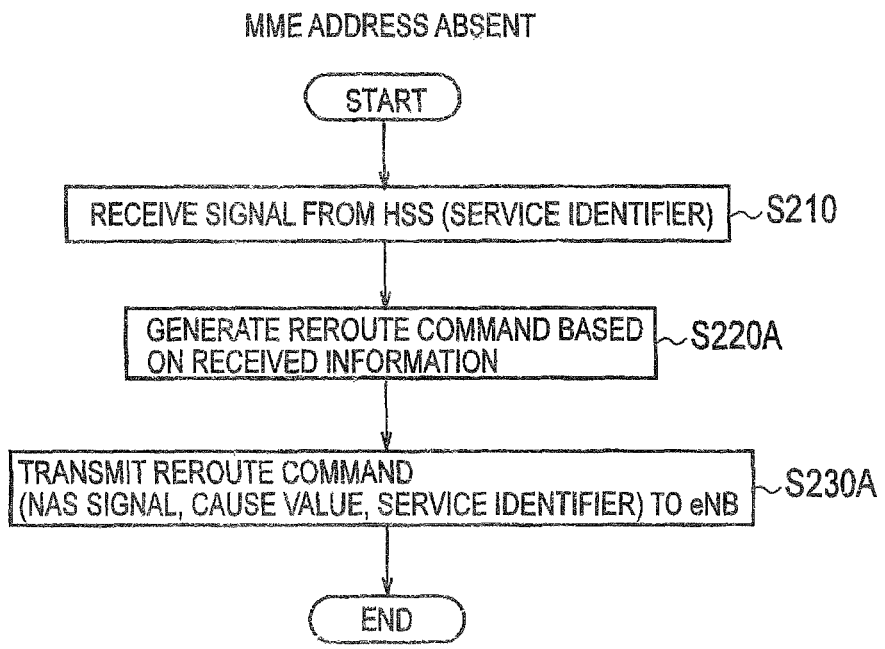

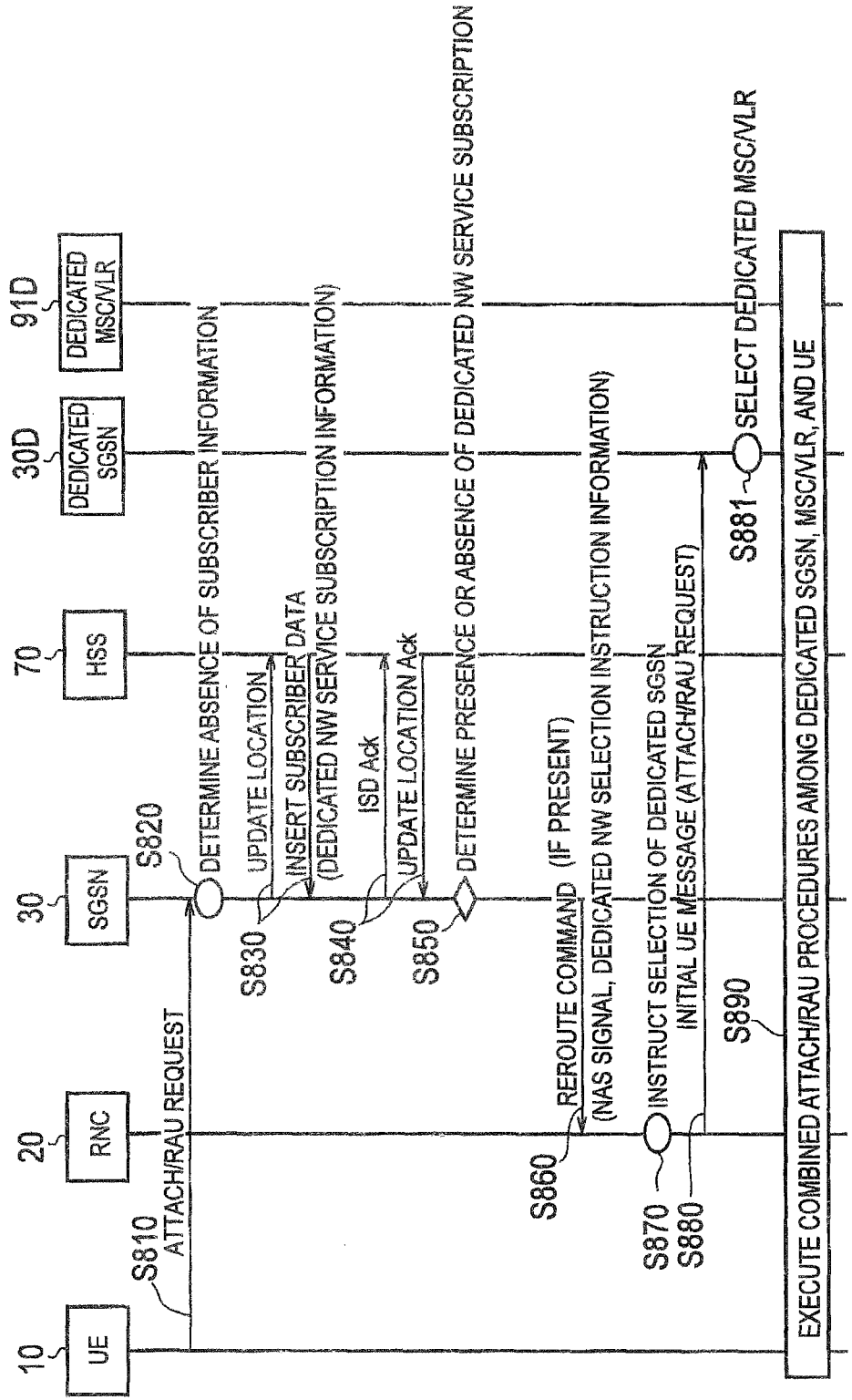

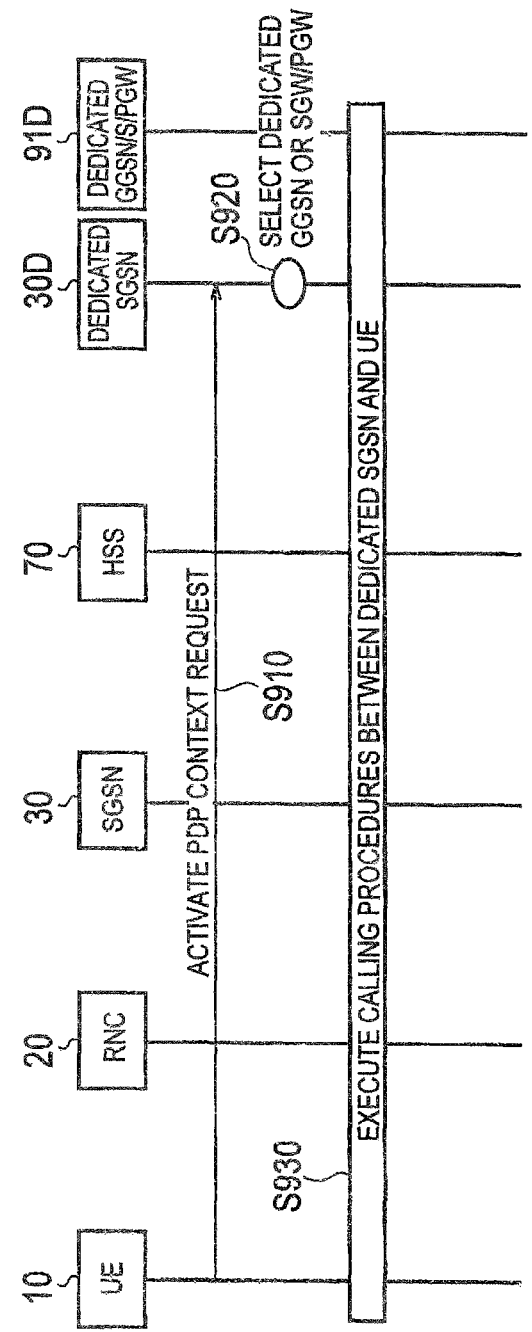

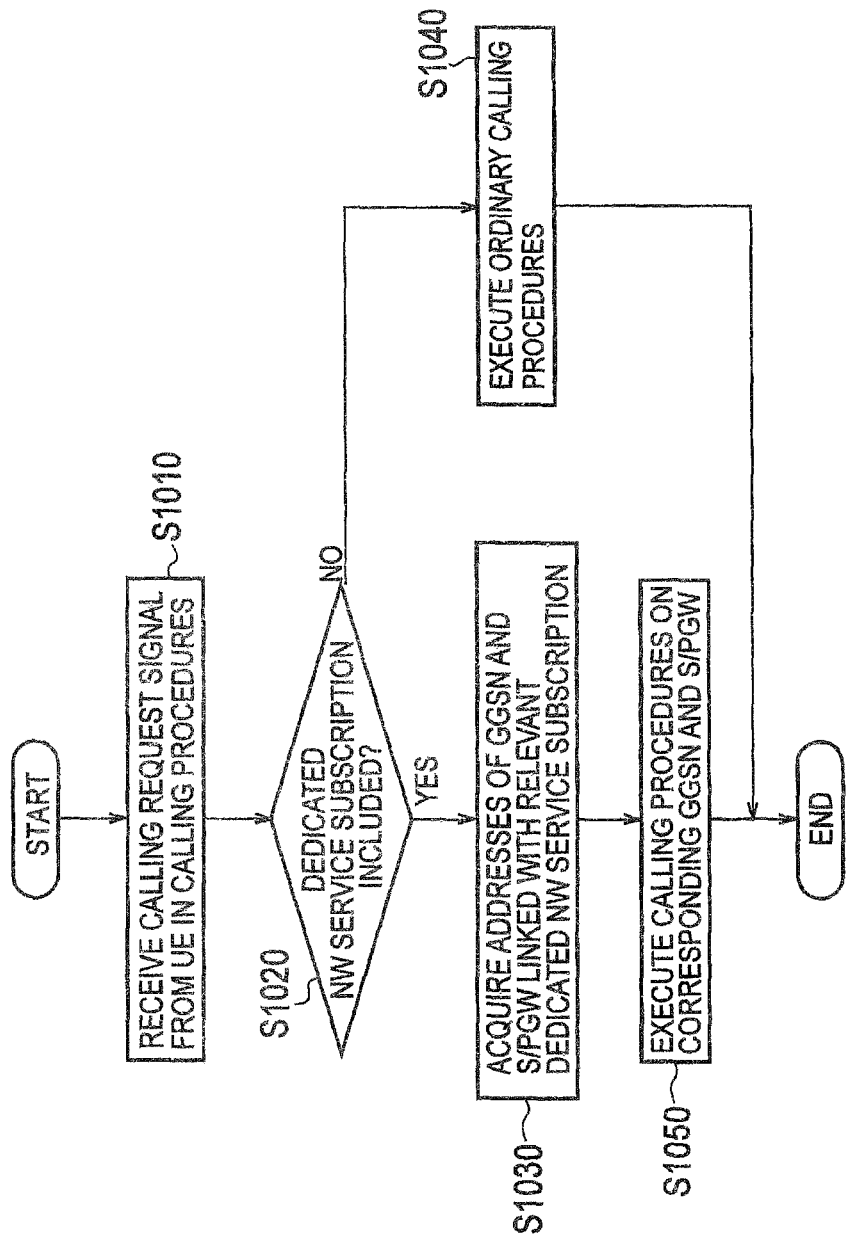

MOBILE COMMUNICATION SYSTEM, NETWORK NODE, AND MOBILE COMMUNICATION METHOD

TECHNICAL FIELD

The present invention relates to a mobile communication system, a network node, and a mobile communication method, which cause user equipment of a particular type to attach to a dedicated network.

BACKGROUND ART

In 3rd Generation Partnership Project (3GPP), there has been defined a low access priority indicator (LAPI), with which it is possible to identify user equipment (UE) of a particular type as having a lower priority than that of other user equipment (see Non-patent document 1).

For example, consideration and introduction of M2M (Machine-to-Machine) architecture have been in progress in recent years. In the M2M architecture, machines connected to a mobile communication network communicate with each other and automatically conduct appropriate control of the machines without requiring human operations. In the case of UE compatible with the M2M architecture, a communication type, a frequency of communication, and communication traffic are different from those of ordinary UE such as a smartphone. Accordingly, a service provided to the M2M-compatible UE can be differentiated from that provided to other UE, by setting an LAPI to the M2M-compatible UE.

Non-patent document 1 defines a method of causing the UE, to which the LAPI is set, to select any of network nodes constituting a dedicated network, the network nodes including a mobility management entity (MME), a serving gateway (SGW), a PDN (Packet Data Network) gateway (PGW), and the like, i.e., a method of causing the UE to attach to the dedicated network. Specifically, when an LAPI is set to an RRC signal (an attachment request) transmitted from the UE, an eNodeB (eNB) transmits the attachment request from the UE to one of the network nodes constituting the dedicated network based on information on the dedicated network configured in advance.

The above-described method using the LAPI can cause the M2M-compatible UE to attach to the dedicated network provided separately from a network for ordinary UE such as a smartphone. As a consequence, even when congestion occurs due to traffic attributed to transmission and reception by the M2M-compatible UE, it is possible to eliminate adverse effects on the ordinary UE. Meanwhile, as mentioned above, in the case of the M2M-compatible UE, the communication type, the frequency of communication, and the communication traffic are different from those of the ordinary UE such as the smartphone. Accordingly, it is possible to install network nodes specialized in the M2M-compatible UE and provided with simplified functions, and thus to reduce capital expenditure.

PRIOR ART DOCUMENT

Non-Patent Document

Non-patent document 1: 3GPP TS 23.401 V12.1.0 Subclause 4.3.7.2 Load Balancing between MMEs, Subclause 4.3.17.2 Overview of protection from Potential MTC Related Overload, 3rd Generation Partnership Project; Technical Specification Group Services and System Aspects; General Packet Radio Service (GPRS) enhancements for Evolved Universal Terrestrial Radio Access Network (E-UTRAN) access (Release 12), 3GPP, June, 2013

SUMMARY OF THE INVENTION

However, the above-described LAPI has the following problem. Specifically, the LAPI is supported only from 3GPP TS Release 10, and in the case of UE compatible with a release earlier than Release 10 such as UE compatible with Release 8 or Release 9, the UE cannot attach to the dedicated network for the UE of the particular type by using the LAPI.

The present invention has been made in view of the aforementioned circumstances. An objective of the present invention is to provide a mobile communication system, a network node, and a mobile communication method, which can cause user equipment of a particular type to attach to a dedicated network regardless of whether or not the user equipment supports a low access priority indicator (LAPI).

In summary, a first aspect of the present invention provides a mobile communication system including: a first network node; a second network node; and a dedicated network node constituting a dedicated network. The first network includes: a subscriber information acquisition unit configured to acquire subscriber information on user equipment from a subscriber server based on an attachment request from the user equipment forwarded by the second network node, the subscriber information including availability for the user equipment to use the dedicated network; and a selection instruction transmission unit configured to send the second network node a selection instruction to select the dedicated network based on the subscriber information acquired by the subscriber information acquisition unit. The second network includes: a selection instruction reception unit configured to receive the selection instruction from the first network node; and a network selection control unit configured to determine the dedicated network node constituting the dedicated network based on the selection instruction received by the selection instruction reception unit, and to transmit the attachment request from the user equipment to the determined dedicated, network node.

In summary, a second aspect of the present invention provides a network node constituting a mobile communication system, including: a subscriber information acquisition unit configured to acquire subscriber information on user equipment from a subscriber server based on an attachment request from the user equipment forwarded by a different network node, the subscriber information including availability for the user equipment to use a dedicated network; and a selection instruction transmission unit configured to send the different network node a selection instruction to select the dedicated network based on the subscriber information acquired by the subscriber information acquisition unit.

In summary, a third aspect of the present invention provides a network node constituting a mobile communication system, including: a selection instruction reception unit configured to receive from a different network node a selection instruction to select a dedicated network by user equipment; and a network selection control unit configured to determine a dedicated network node constituting the dedicated network based on the selection instruction received by the selection instruction reception unit, and to transmit an attachment request from the user equipment to the determined dedicated network node.

In summary, a fourth aspect of the present invention provides a mobile communication method to be implemented by a first network node, a second network node, and a dedicated network node constituting a dedicated network, the method comprising the steps of: causing the first network node to acquire subscriber information on user equipment from a subscriber server based on an attachment request from the user equipment forwarded by the second network node, the subscriber information including availability for the user equipment to use the dedicated network; causing the first network node to send the second network node a selection instruction to select the dedicated network based on the acquired subscriber information; causing the second network node to receive the selection instruction from the first network node; and causing the first network node to determine the dedicated network node constituting the dedicated network based on the received selection instruction, and to transmit an attachment request from the user equipment to the determined dedicated network node.

BRIEF DESCRIPTION OF THE DRAWINGS

FIG. 9 illustrates charts showing operation flows of the eNB 50 in the Attach/TAU sequence and the combined Attach/TAU sequence according to the first embodiment of the present invention.

FIG. 10 illustrates charts showing operation flows of the MME 60 in the Attach/TAU sequence and the combined Attach/TAU sequence according to the first embodiment of the present invention.

FIG. 19 is a diagram showing a combined Attach/RAU sequence according to the second embodiment of the present invention.

FIG. 20 is a diagram showing a calling sequence of the UE 10 according to the second embodiment of the present invention.

FIG. 21 is a chart showing an operation flow for attachment of the UE 10 to a dedicated network, which is conducted by a dedicated SGSN 30D according to the second embodiment of the present invention.

MODES FOR CARRYING OUT THE INVENTION

Next, an embodiment of the present invention will be described. Note that, in the following description of the drawings, same or similar reference signs denote same or similar elements and portions. In addition, it should be noted that the drawings are schematic and ratios of dimensions and the like are different from actual ones.

Therefore, specific dimensions and the like should be determined in consideration of the following description. Moreover, the drawings also include portions having different dimensional relationships and ratios from each other.

Figure 1:
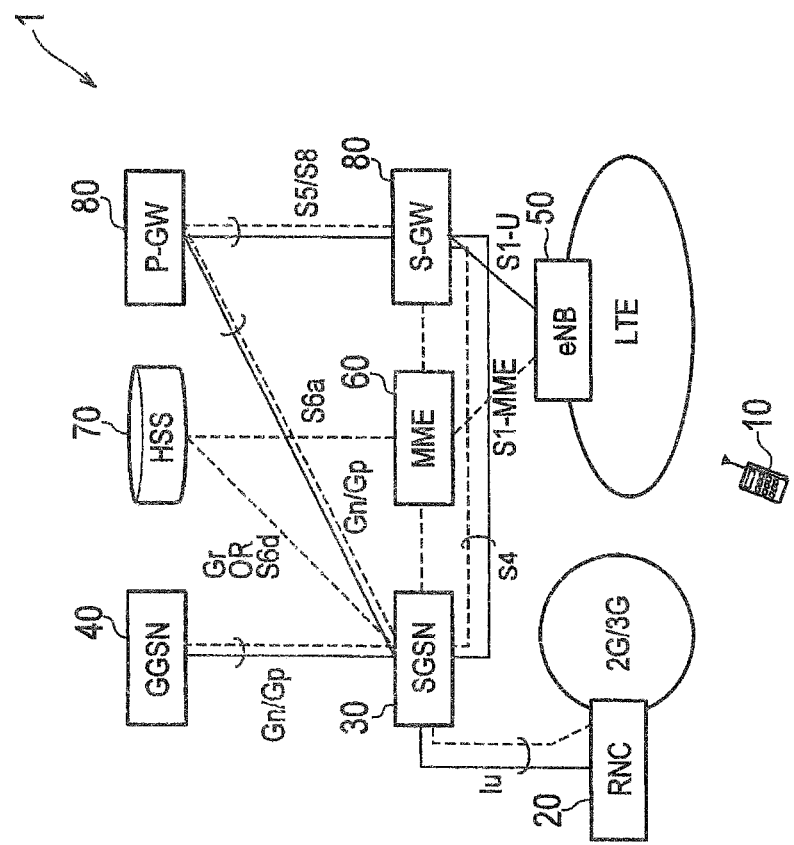
FIG. 1 is an overall schematic configuration diagram of a mobile communication system 1 according to an embodiment of the present invention.

[First Embodiment]
(1) Overall Schematic Configuration of Mobile Communication System FIG. 1 is an overall schematic configuration diagram of a mobile communication system 1 according to a first embodiment of the present invention. As shown in FIG. 1, the mobile communication system 1 includes a mobile communication system adapted to a 2G/3G mode and a mobile communication system adapted to a Long Term Evolution (LTE) mode, both being defined by 3rd Generation Partnership Project (3GPP). User equipment 10 (hereinafter UE 10) can execute radio communication through the mobile communication systems of the 2G/3G mode and the LTE mode. Here, the UE 10 may be configured to execute the radio communication through the mobile communication system of any one of these modes.

The mobile communication system of the 2G/3G mode (GPRS) includes a Radio Network Controller 20 (hereinafter an RNC 20), a Serving GPRS Support Node 30 (hereinafter an SGSN 30), and a Gateway GPRS Support Node 40 (hereinafter a GGSN 40).

The mobile communication system of the LTE mode (EPC) includes an eNodeB 50 (hereinafter an eNB 50), a Mobility Management Entity 60 (hereinafter an MME 60), and a Serving Gateway/PDN Gateway 80 (hereinafter an S/PGW 80).

Meanwhile, a Home Subscriber Server 70 (hereinafter an HSS 70) is a core network device (a subscriber server) used in the 2G/3G mode and the LTE mode in common, which manages subscriber information on the UE 10, and the like.

Here, a not-illustrated Policy and Charging Rules Function (PCRF) and the like are included in the mobile communication system 1.

(2) Outline of Functions Provided by Mobile Communication System

This embodiment describes functions and operations of the LTE-mode mobile communication system.

(2.1) Operation Outline

Figure 2:
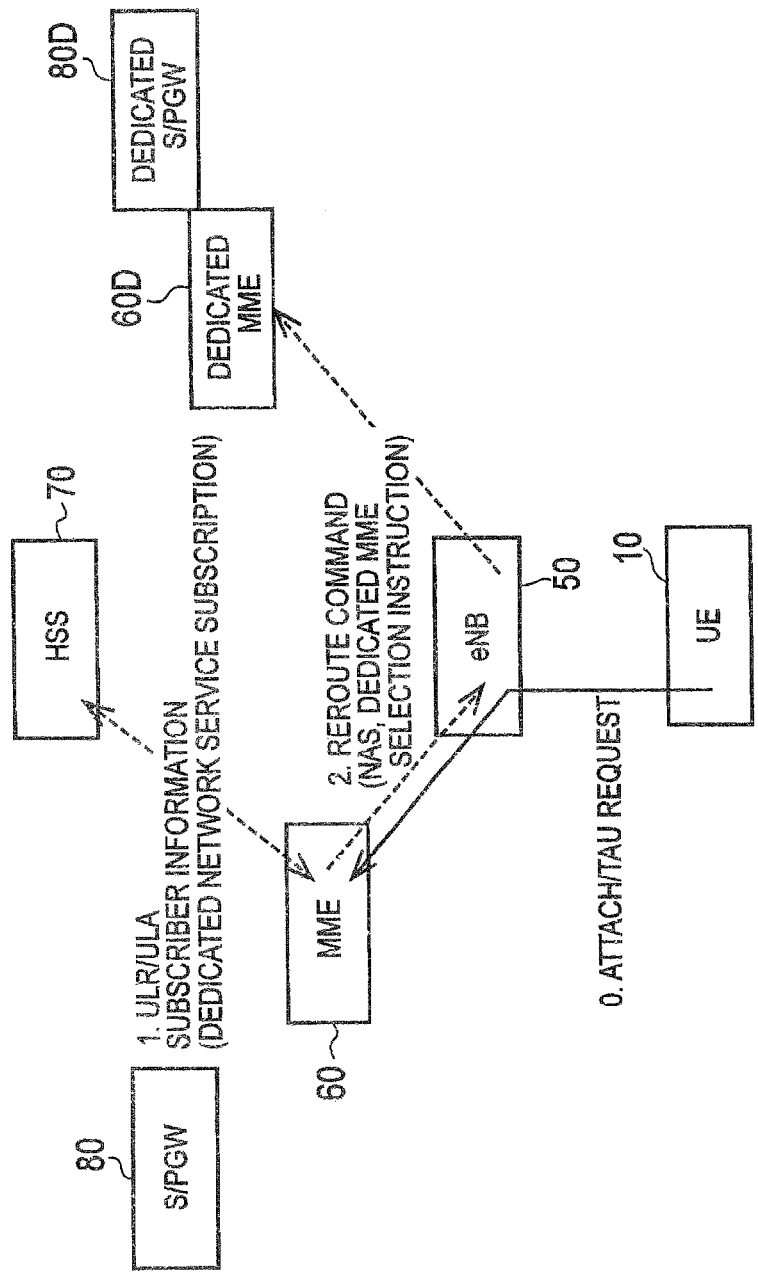
FIG. 2 is an explanatory diagram of an operation outline of an LTE-mode mobile communication system according to a first embodiment of the present invention.

FIG. 2 is an explanatory diagram of an operation outline of an LTE-mode mobile communication system. As shown in FIG. 2, in this embodiment, functions to be provided are realized by a dedicated MME 60D and a dedicated S/PGW 80D in addition to the eNB 50 and the MME 60. In this embodiment, the MME 60 constitutes a first network node and the eNB 50 constitutes a second network node. Meanwhile, the dedicated MME 60D constitutes a dedicated network node.

The UE 10 executes ordinary Attach/TAU (Tracking Area Update) procedures (0. Attach/TAU Request in FIG. 2), and the eNB 50 forwards the Attach/TAU Request to the MME 60. Based on the Attach/TAU Request, the MME 60 downloads subscriber information on the UE 10 from the HSS 70 (1. ULR/ULA (Update-Location-Request/Answer) in FIG. 2). In this embodiment, the subscriber information can include a dedicated network service subscription.

When the dedicated network service subscription is included in the subscriber information, the MME 60 sends the eNB 50, which forwarded the Attach/TAU Request, an Access Stratum (AS) layer signal (2. Reroute command in FIG. 2) that includes a selection instruction to select the dedicated MME 60D constituting a dedicated network and the signal corresponding to 0. Attach/TAU Request in FIG. 2. Having received the AS signal, the eNB 50 selects the dedicated MME 60D instead of the MME 60 based on the Reroute command, and executes the Attach/TAU procedures on the dedicated MME 60D. Specifically, the eNB 50 sends the dedicated MME 60D an Initial UE message including an NAS signal received from the MME 60 (3. Initial UE message in FIG. 2). The dedicated MME 60D continues the Attach/TAU procedures on the dedicated S/PGW 80D.

(2.2) Configuration Examples of Dedicated Network Service Subscription

In this embodiment, there are three possible configurations shown below as the dedicated network service subscription included in the subscriber information.

(2.2.1) Configuration Example 1

The presence or absence of the dedicated network service subscription by the UE 10 is indicated by using one bit (0 or 1). For example, the absence of the dedicated network service subscription is indicated in the case of 0 and the presence of the dedicated network service subscription is indicated in the case of 1.

(2.2.2) Configuration Example 2

A low access priority indicator (LAPI) is treated as the dedicated network service subscription. For example, the dedicated network service subscription is determined to be absent when the LAPI is not set to the subscriber information (when an indication bit for the LAPI is 0), and the dedicated network service subscription is determined to be present when the LAPI is set to the subscriber information (when the indication bit for the LAPI is 1).

(2.2.3) Configuration Example 3

Figure 3:
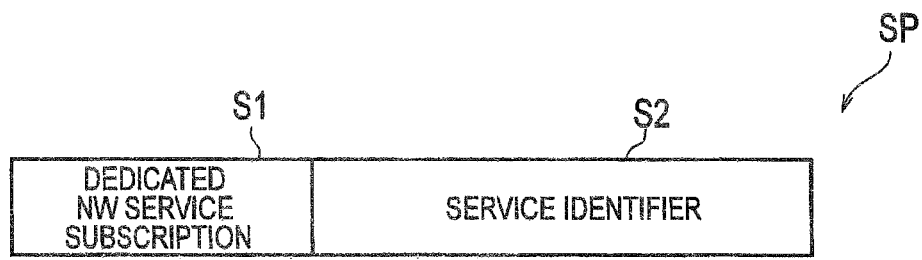
FIG. 3 is a diagram showing an example of subscriber information SP according to the first embodiment of the present invention.

Besides the bit indicating the presence or absence of the dedicated network service subscription, a service ID to indicate a service type is additionally provided. FIG. 3 shows an example of subscriber information SP used in the case of Configuration Example 3. As shown in FIG. 3, the subscriber information SP includes a service subscription identification unit S1 and a service identification unit S2. Of course, the subscriber information SP may also include information other than the service subscription identification unit S1 and the service identification unit S2. The service subscription identification unit S1 is formed from at least one bit. Meanwhile, the service identification unit S2 is formed from bits (bytes), the number of which corresponds to the number of intended service types.

Configuration Example 3 can be suitably used, for example, when a dedicated network is constructed corresponding to a certain service. For instance, when either a network dedicated for UE connected to an electricity meter or a network dedicated for UE mounted on an automobile is constructed, the UE can attach to the dedicated network based on a service identifier to be identified by the service identification unit S2, the dedicated network corresponding to the service identifier.

(3) Functional Block Configurations of Mobile Communication System

Next, functional block configurations of the mobile communication system of this embodiment will be described. Specifically, functional block configurations of the MME 60, the eNB 50, and the dedicated MME 60D will be described. Note that the following description will be intended only for the functional blocks related to this embodiment, and that the devices also have functions other than the relevant functional blocks.

(3.1) MME 60

Figure 4:
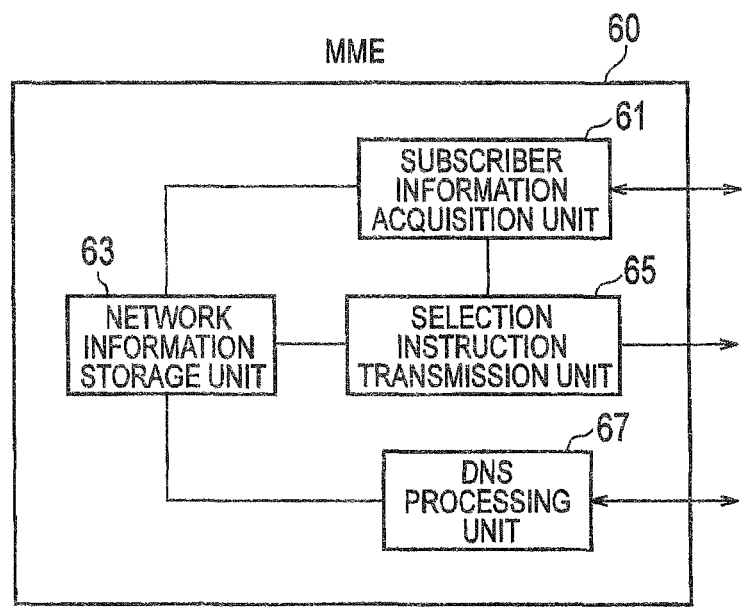
FIG. 4 is a functional block configuration diagram of an MME 60 according to the first embodiment of the present invention.

FIG. 4 is a functional block diagram of the MME 60. As shown in FIG. 4, the MME 60 includes a subscriber information acquisition unit 61, a network information storage unit 63, a selection instruction transmission unit 65, and a DNS processing unit 67.

The subscriber information acquisition unit 61 acquires the subscriber information on the UE 10. Specifically, the subscriber information acquisition unit 61 acquires the subscriber information on the UE 10 stored in the HSS 70, such as the contents of the service subscription by the UE 10 and information indicating a priority in the mobile communication network. Particularly, in this embodiment, the subscriber information acquisition unit 61 acquires the subscriber information on the UE 10 from the HSS 70 based on an attachment request (an Attach/TAU Request) from the UE 10 forwarded by the eNB 50, the subscriber information including availability for the UE 10 to use the dedicated network.

Here, as mentioned above, the subscriber information may include a low priority identifier indicating that the UE 10 has a lower priority than that of other user equipment, i.e., the LAPI. Meanwhile, as mentioned above, the subscriber information may include the service identifier (see FIG. 3) indicating the type of the service to be used by the UE 10.

The network information storage unit 63 stores information concerning network nodes constituting the mobile communication system 1. Specifically, the network information storage unit 63 stores addresses of the network nodes and the like as well as the subscriber information.

Particularly, in this embodiment, the network information storage unit 63 stores the addresses of the dedicated MME 60D and the dedicated S/PGW 80D which constitute the dedicated network. Meanwhile, the network information storage unit 63 may also store links each between a service identifier and the dedicated network depending on the type (such as the network dedicated for the UE connected to the electricity meter and the network dedicated for the UE mounted on the automobile as described above) as well as the addresses of the dedicated MME 60D and the dedicated S/PGW 80D which constitute the relevant dedicated network.

The selection instruction transmission unit 65 sends the eNB 50 a selection instruction to select the dedicated network based on the subscriber information acquired by the subscriber information acquisition unit 61. Specifically, the selection instruction transmission unit 65 sends the eNB 50 a Reroute command which includes: the selection instruction to select the dedicated MME 60D; and the NAS signal.

When the subscriber information includes the LAPI, the selection instruction transmission unit 65 may determine that the use of the dedicated network is permitted and transmit the selection instruction to the eNB 50. Meanwhile, based on the service identifier included in the subscriber information, the selection instruction transmission unit 65 may also send the eNB 50 the selection instruction to select the dedicated network linked with the relevant service identifier.

In conjunction with a DNS server 92 (see FIG. 12), the DNS processing unit 67 executes name resolution processing on the network node constituting the dedicated network. Specifically, when the network information storage unit 63 does not store an IP address of the dedicated MME 60D in advance, for example, the DNS processing unit 67 executes processing (S-NAPTR) in conjunction with the DNS server 92 and in accordance with a DNS protocol, thereby acquiring the IP address of the dedicated MME 60D or the like. The DNS processing unit 67 stores the IP address of the dedicated MME 60D or the like, which is acquired from the DNS server 92, in the network information storage unit 63.

(3.2) eNB 50

Figure 5:
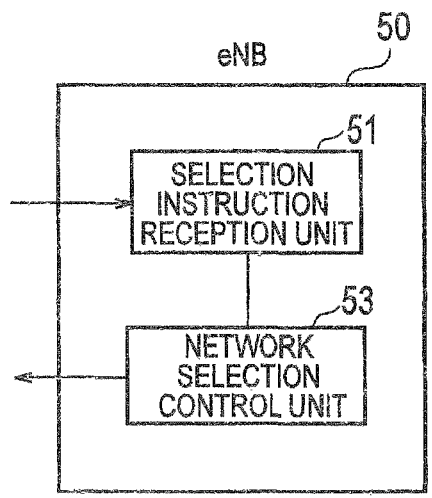
FIG. 5 is a functional block configuration diagram of an eNB 50 according to the first embodiment of the present invention.

FIG. 5 is a functional block configuration diagram of the eNB 50. As shown in FIG. 5, the eNB 50 includes a selection instruction reception unit 51 and a network selection control unit 53.

The selection instruction reception unit 51 receives from the MME 60 the selection instruction (the Reroute command) to select the dedicated network. Specifically, the selection instruction reception unit 51 receives from the MME 60 an Access Stratum (AS) signal which includes: the selection instruction to select the dedicated MME 60D constituting the relevant dedicated network; and the NAS signal.

The network selection control unit 53 determines the dedicated MME 60D constituting the dedicated network, based on the selection instruction received by the selection instruction reception unit 51, and transmits an attachment request from the UE 10 to the determined dedicated MME 60D.

Specifically, based on the IP address of the dedicated MME 60D constituting the relevant selection instruction, the network selection control unit 53 sends the dedicated MME 60D an Initial UE message including the NAS signal received from the MME 60. Alternatively, the network selection control unit 53 may refer to an address (an MME address) of the dedicated MME 60D configured in the eNB 50 in advance, and send the dedicated MME 60D the Initial UE message including the NAS signal received from the MME 60.

(3.3) Dedicated MME 60D

Figure 6:
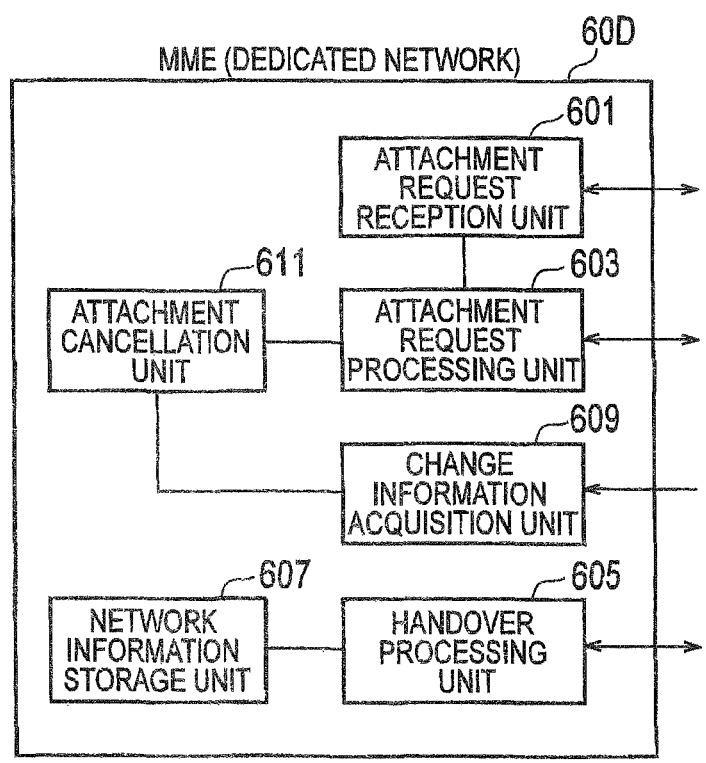
FIG. 6 is a functional block configuration diagram of a dedicated MME 60D according to the first embodiment of the present invention.

FIG. 6 is a functional block diagram of the dedicated MME 60D. As shown in FIG. 6, the dedicated MME 60D includes an attachment request reception unit 601, an attachment request processing unit 603, a handover processing unit 605, and a network information storage unit 607.

The attachment request reception unit 601 receives the attachment request transmitted from the eNB 50. Specifically, the attachment request reception unit 601 receives from the eNB 50 the Initial UE message including the NAS signal that is received from the MME 60.

The attachment request processing unit 603 executes processing of the request for attachment of the UE 10 to the dedicated network based on the Attach/TAU Request which is included in the Initial UE message received by the attachment request reception unit 601.

The handover processing unit 605 executes handover processing of the UE 10 attaching to the dedicated network constituted by the dedicated MME 60D. Specifically, when a handover request for the UE 10 is received from the eNB 50, the handover processing unit 605 refers to the information (such as IP addresses) on different dedicated network nodes stored in the network information storage unit 607 if the UE 10 is permitted to use the dedicated network. Then, the handover processing unit 605 determines a different dedicated network node (an MME) constituting the dedicated network and linked with a handover target of the UE 10.

The handover processing unit 605 forwards the handover request to the different dedicated network node thus determined. The above-described function of the handover processing unit 605 allows the UE 10 to continue the use of the dedicated network (such as the above-described network dedicated for the UE mounted on the automobile) even when the UE 10 is handed over due to its movement or the like.

The network information storage unit 607 stores the information concerning the network nodes constituting the mobile communication system 1. Specifically, the network information storage unit 607 stores the addresses of the network nodes and the like as well as the subscriber information.

Particularly, in this embodiment, the network information storage unit 607 stores addresses of a dedicated MME and a dedicated S/PGW which constitute the dedicated network. Meanwhile, the network information storage unit 607 can also store links each between a service identifier and the dedicated network depending on the type, and the addresses of the dedicated MME and the dedicated S/PGW which constitute the relevant dedicated network.

A change information acquisition unit 609 acquires change information from the HSS 70, the change information indicating a change in availability for the UE 10 to use the dedicated network. Specifically, the change information acquisition unit 609 acquires Insert Subscriber Data (ISD) concerning the UE 10 from the HSS 70, and determines based on the acquired ISD that the availability for the UE 10 to use the dedicated network has been changed.

An attachment cancellation unit 611 cancels the state of attachment of the UE 10 to the dedicated network. Specifically, based on the change information (the ISD) acquired by the change information acquisition unit 609, the attachment cancellation unit 611 cancels the state of attachment of the UE 10 to the dedicated network, and causes the UE 10 to execute a new attachment request. Note that there are several operation examples as for an operation to cancel the state of attachment of the UE 10 to the dedicated network. The operation examples will be described later.

(4) Operations of Mobile Communication System

Next, operations of the mobile communication system 1 of this embodiment will be described. Specifically, descriptions will be given of (4.1) Attach/TAU Sequence, (4.2) Combined Attach/TAU Sequence, (4.3) Operations Based on Selection Instruction (Reroute command), (4.4) Operation Flows of Dedicated MME 60D, (4.5) Operations at Handover of UE 10, and (4.6) Operations at Change in Subscription by UE 10.

(4.1) Attach/TAU Sequence

Figure 7:
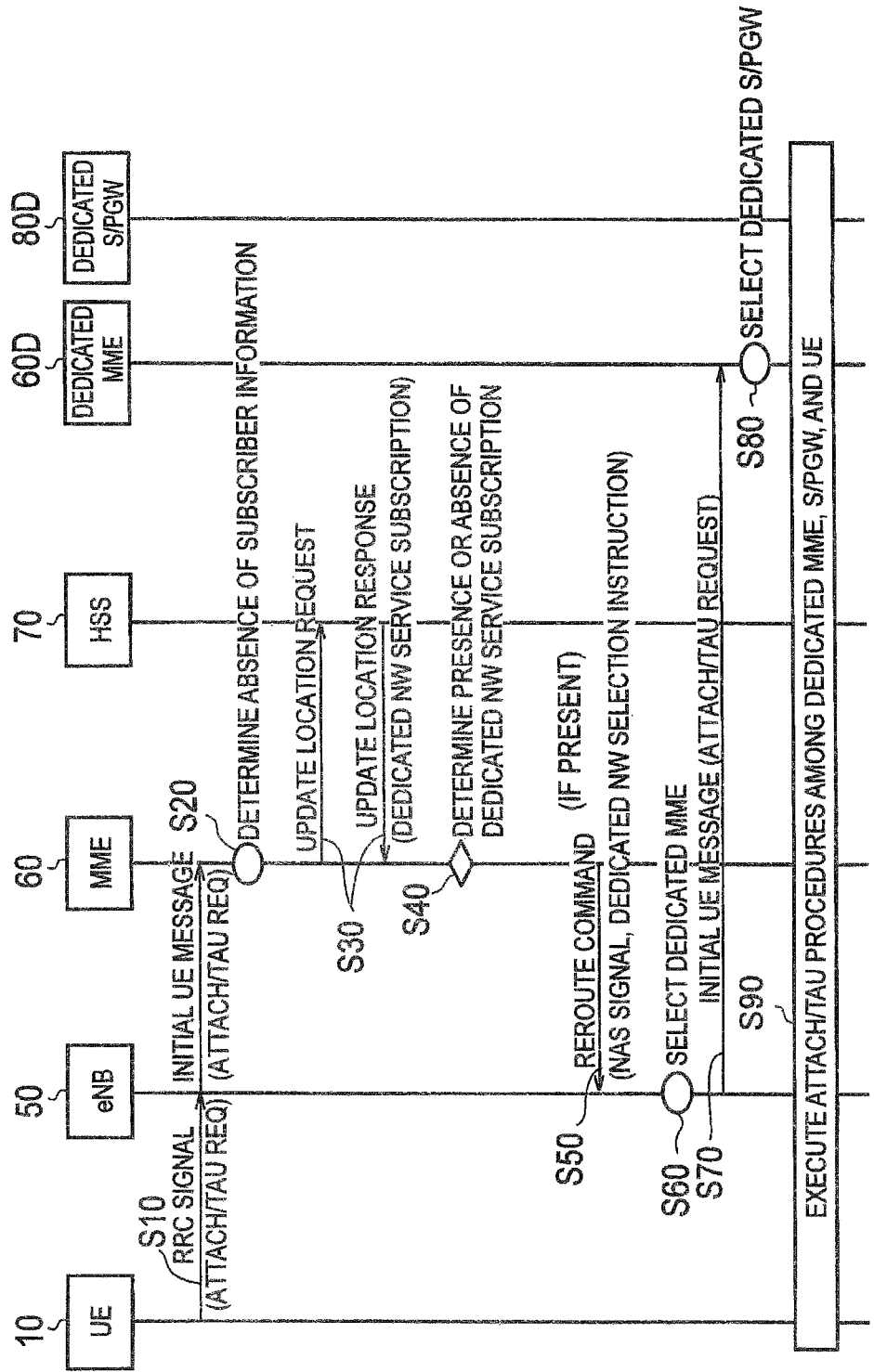
FIG. 7 is a diagram showing an Attach/TAU sequence according to the first embodiment of the present invention.

FIG. 7 shows an Attach/TAU sequence in the mobile communication system 1. As shown in FIG. 7, the UE 10 sends the eNB 50 an RRC signal including the Attach/TAU Request. The eNB 50 sends the MME 60 an Initial UE message including the Attach/TAU Request (S10).

Here, the MME 60 does not retain the subscriber information on the UE 10, and the MME 60 having received the Initial UE message determines that the subscriber information on the UE 10 is absent (S20). Accordingly, the MME 60 transmits an Update Location Request to the HSS 70, thereby receiving an Update Location Response from the HSS 70 (S30). Information indicating the presence or absence of the dedicated network service subscription is included in the Update Location Response.

Based on the Update Location Response, the MME 60 determines the presence or absence of the dedicated network service subscription by the UE 10 (S40). When the dedicated network service subscription is present, the MME 60 transmits the Reroute command to the eNB 50 (S50). The NAS signal and the selection instruction to select the dedicated network are included in the Reroute command. In the meantime, the Reroute command is transmitted to the eNB 50 as the AS layer signal.

Having received the Reroute command, the eNB 50 selects the dedicated MME 60D based on the selection instruction, and sends the dedicated MME 60D the Initial UE message including the NAS signal received from the MME 60 (S60, S70).

Having received the Initial UE message, the dedicated MME 60D selects the dedicated S/PGW 80D constituting the dedicated network (S80). The dedicated MME 60D and the dedicated S/PGW 80D execute the Attach/TAU procedures in conjunction with the UE 10 (S90). Here, the Attach/TAU procedures are executed in accordance with procedures defined by 3GPP.

(4.2) Combined Attach/TAU Sequence

Figure 8:
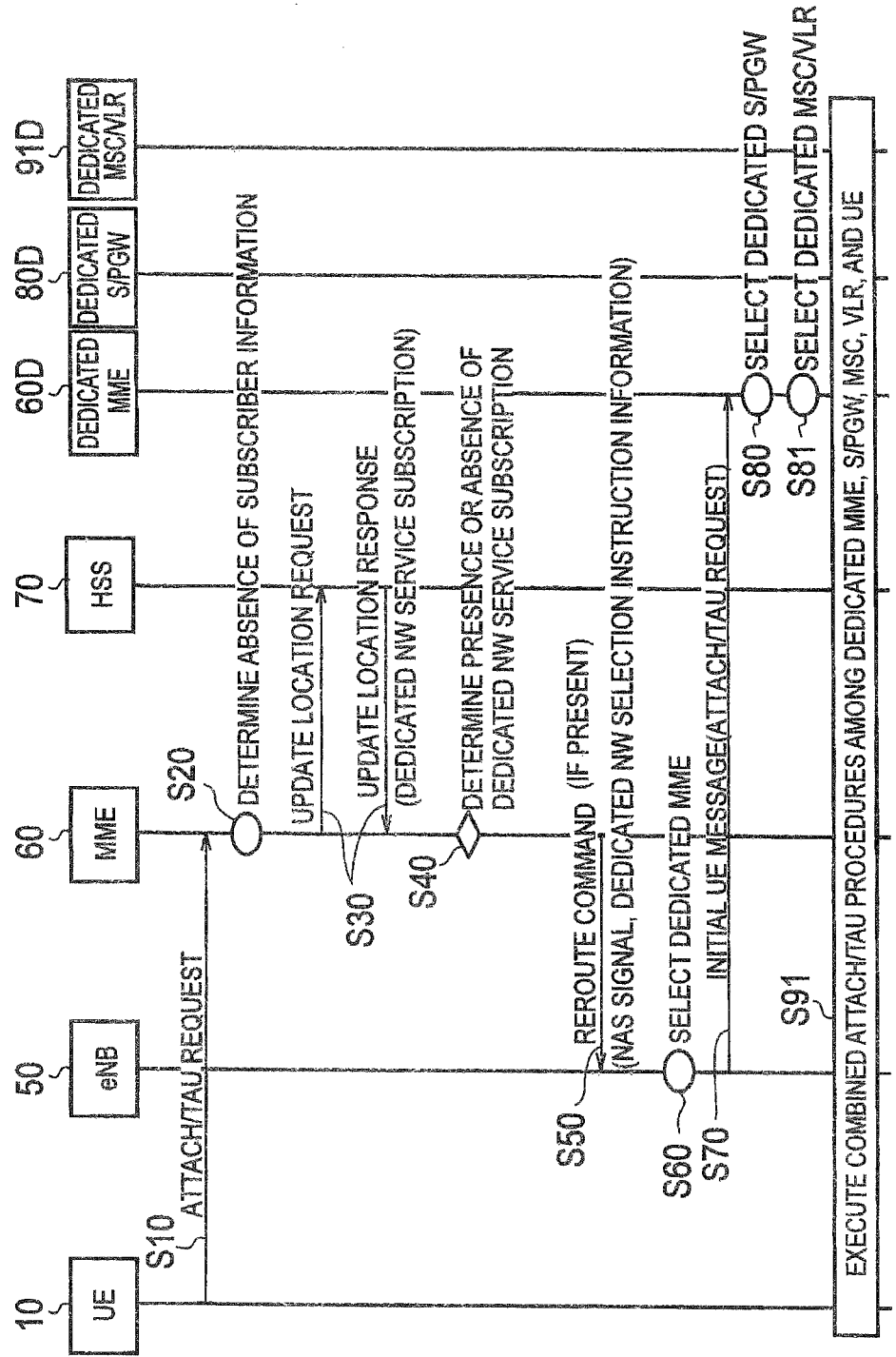
FIG. 8 is a diagram showing a combined Attach/TAU sequence according to the first embodiment of the present invention.

FIG. 8 shows a combined Attach/TAU sequence in the mobile communication system 1. The combined Attach/TAU sequence is substantially similar to the ordinary Attach/TAU sequence shown in FIG. 7, but is different in that a dedicated MSC/VLR 91D is also selected by the dedicated MME 60D (S81) in addition to the selection of the dedicated S/PGW 80D (S80).

The dedicated MME 60D, the dedicated S/PGW 80D, and the dedicated MSC/VLR 91D execute combined Attach/TAU procedures in conjunction with the UE 10. Here, the combined Attach/TAU procedures are executed in accordance with procedures defined by 3GPP.

(4.3) Operations Based on Selection Instruction (Reroute command)

Next, operation flows of the eNB 50 and the MME 60 based on a configuration of the selection instruction (the Reroute command) will be described, (4.3.1) Operation Flows of eNB 50: Configuration Examples 1, 2

FIGS. 9(*a*) and 9(*b*) show operation flows of the eNB 50 in the Attach/TAU sequence and the combined Attach/TAU sequence (see FIG. 7 and FIG. 8). The operation flows shown in FIGS. 9(*a*) and 9(*b*) are applied to the case of Configuration Example 1 (in which the presence or absence of the dedicated network service subscription is designated by 0 or 1) or Configuration Example 2 (in which the LAPI is used) of the dedicated network service subscription mentioned above.

FIG. 9(*a*) shows the operation flow of the eNB 50 when a signal including the IP address (an MME address) of the dedicated MME 60D and the NAS signal is received from the MME 60.

As shown in FIG. 9(*a*), the eNB 50 receives the signal (the Reroute command) from the MME 60 (S110). The signal includes the NAS signal, a Cause value (the selection instruction to select the dedicated network), and the IP address (the MME address) of the dedicated MME 60D.

The eNB 50 generates another signal based on the received signal (S120). Specifically, the eNB 50 generates an Initial UE message based on the Cause value and the MME address included in the received signal.

The eNB 50 transmits the generated Initial UE message (the NAS signal) to the dedicated MME 60D specified by the MME address (S130).

FIG. 9(*b*) shows the operation flow of the eNB 50 when the MME address is not included in the Reroute command. As shown in FIG. 9(*b*), the signal (the Reroute command) that the eNB 50 receives from the MME 60 only includes the NAS signal and the Cause value but does not include the MME address (S110A).

Accordingly, the eNB 50 generates a signal based on the Cause value included in the received signal and on the address (the MME address) of the dedicated MME 60D configured in the eNB 50 in advance (S120A). Note that the operation in step S130 is similar to that in the case where the MME address is included in the Reroute command (see FIG. 9(*a*)).

(4.3.2) Operation Flows of MME 60: Configuration Example 3

FIGS. 10(*a*) and 10(*b*) show operation flows of the MME 60 in the Attach/TAU sequence and the combined Attach/TAU sequence (see FIG. 7 and FIG. 8). The operation flows shown in FIGS. 10(*a*) and 10(*b*) are applied to the case of Configuration Example 3 (in which the service identifier is used) of the dedicated network service subscription mentioned above.

As shown in FIG. 10(*a*), the MME 60 receives from the HSS 70 the signal (the Update Location Response) which includes the service identifier (S210). The MME 60 specifies the IP address (the MME address) of the dedicated MME 60D based on the service identifier included in the received signal, and generates the Reroute command (S220).

Specifically, the MME 60 generates the Reroute command which indicates the dedicated MME constituting the dedicated network linked with the acquired service identifier. The Reroute command includes the NAS signal, the Cause value (the selection instruction to select the dedicated network), and the IP address (the MME address) of the dedicated MME 60D.

The MME 60 transmits the generated Reroute command (the NAS signal) to the eNB 50, to which the Attach/TAU Request is forwarded from the UE 10 (S230).

FIG. 10(*b*) shows the operation flow of the MME 60 when the MME address is not included in the Reroute command. As shown in FIG. 10(*b*), the MME 60 generates the Reroute command based on the information received from the HSS 70 (S220A). The Reroute command does not include the MME address but includes the service identifier instead (S230A).

Note that the eNB 50 having received the Reroute command shown in FIG. 10(*b*) requires an operation to specify the IP address (the MME address) of the dedicated MME corresponding to the service identifier included in the Reroute command.

(4.4) Operation Flows of Dedicated MME 60D

Next, operation flows of the dedicated MME 60D will be described. Specifically, descriptions will be given of an operation for attachment of the UE 10 to the dedicated network when an IP address of the dedicated S/PGW 80D is configured (stored) in the dedicated MME 60D in advance, and an operation to acquire the IP address of the dedicated S/PGW 80D by using a Domain Name System (DNS).

(4.4.1) Operation for Attachment of UE 10 to Dedicated Network

Figure 11:
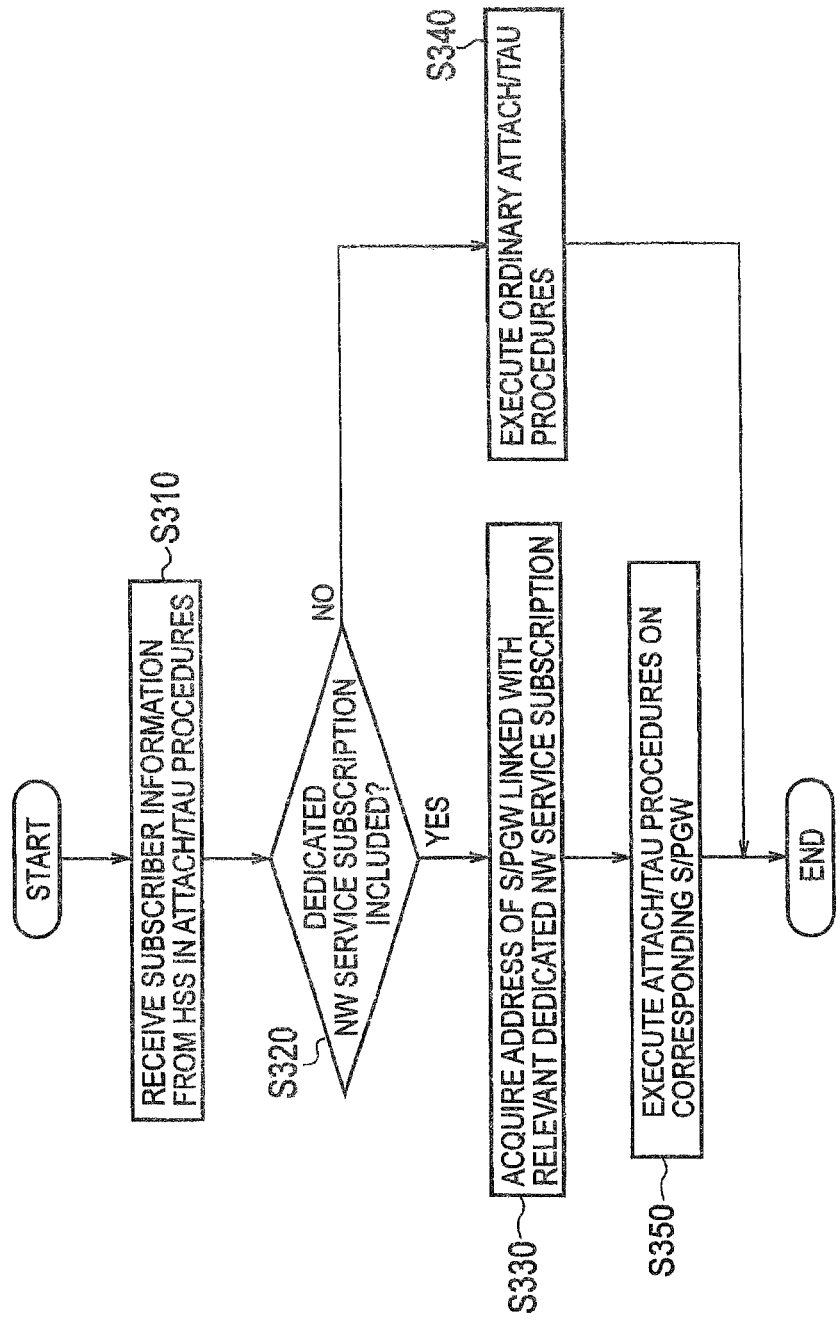
FIG. 11 is a chart showing an operation flow for attachment of UE 10 to a dedicated network, which is conducted by the dedicated MME 60D according to the first embodiment of the present invention.

FIG. 11 shows an operation flow for the attachment of the UE 10 to the dedicated network, which is conducted by the dedicated MME 60D. In this operation example, the IP address of the dedicated S/PGW 80D is assumed to be configured in the dedicated MME 60D in advance.

As shown in FIG. 11, the dedicated MME 60D receives the subscriber information from the HSS 70 in the Attach/TAU procedures for the DE 10 (S310). The dedicated MME 60D determines whether or not the dedicated network service subscription is included in the received subscriber information, or more specifically, whether or not the use of the dedicated network is permitted (S320).

When the dedicated network service subscription is included, the dedicated MME 60D acquires the address (the IP address) of the dedicated S/PGW 80D linked with the dedicated network service subscription (S330). On the other hand, when the dedicated network service subscription is not included (when the use of the dedicated network is not permitted), the dedicated MME 60D executes the Attach/TAU procedures for the UE 10 on an ordinary S/PGW instead of the dedicated S/PGW 80D (S340).

The dedicated MME 60D executes the Attach/TAU procedures for the UE 10 on the dedicated S/PGW 80D specified by the acquired address (S350).

Here, when the UE 10 executes the combined Attach/TAU procedures (see FIG. 8), the dedicated MME 60D also specifies the dedicated MSC/VLR 91D in accordance with procedures similar to those for the dedicated S/PGW 80D.

Figure 12:
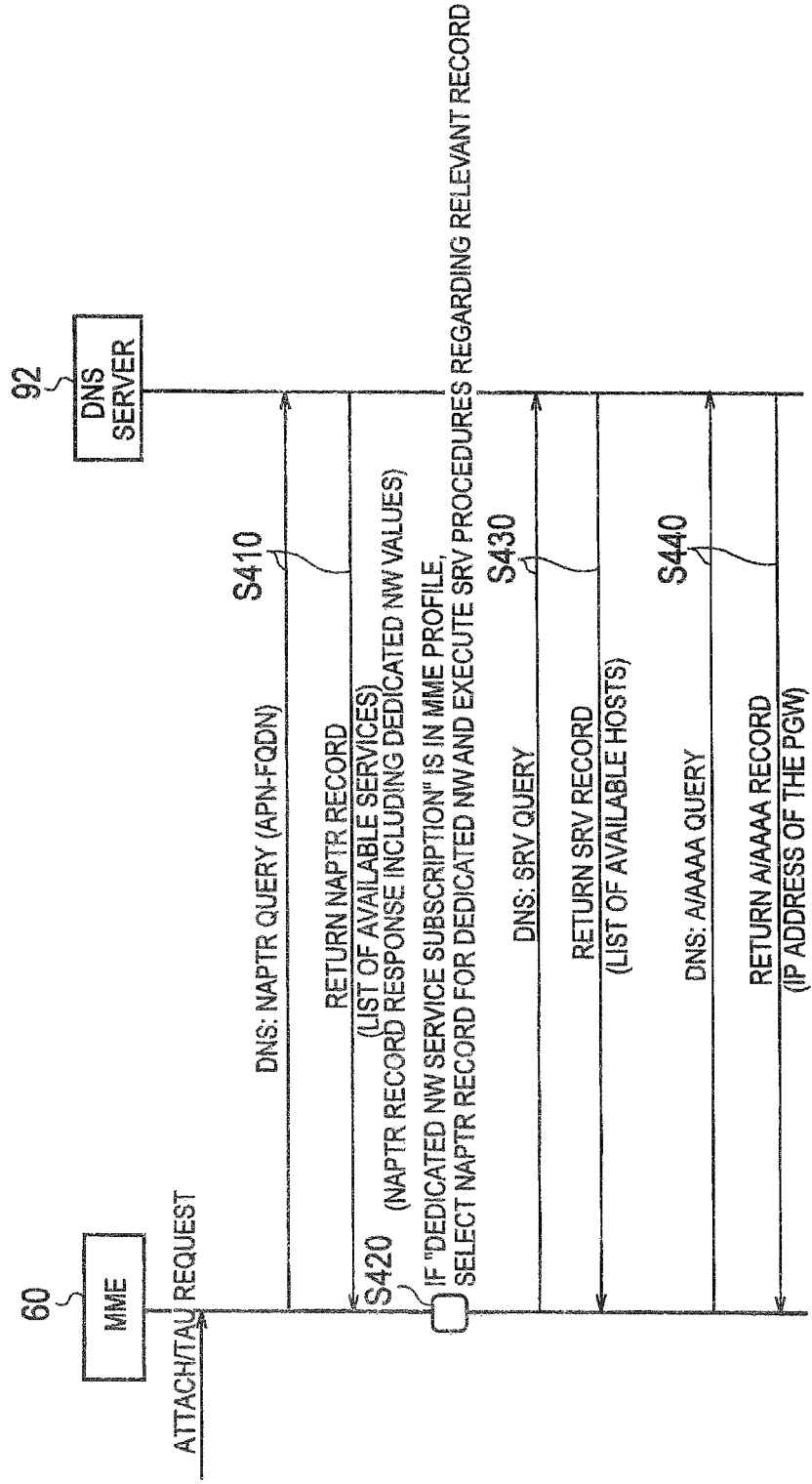
FIG. 12 is a diagram showing a sequence for acquiring an IP address of a dedicated S/PGW 80D, which is conducted by the dedicated MME 60D and a DNS server 92 according to the first embodiment of the present invention.

(4.4.2) Sequence for Acquiring IP Address of Dedicated S/PGW 80D by using DNS FIG. 12 shows a sequence for acquiring the IP address of the dedicated S/PGW 80D, which is conducted by the dedicated MME 60D and the DNS server. As shown in FIG. 12, when the dedicated MME 60D receives the Attach/TAU Request from the UE 10, the dedicated MME 60D sends the DNS server 92 an NAPTR Query (APN-FQDN) in accordance with a DNS protocol, and acquires a Return NAPTR Record (S410). The Return NAPTR Record includes a List of available services, which shows the presence or absence of the dedicated network service subscription as one of the services.

When the dedicated, MME 60D receives the NAPTR Record from the DNS server 92, the dedicated MME 60D selects an NAPTR record for the dedicated network and executes SRV procedures regarding the record if the subscriber information includes the dedicated network service subscription by the UE 10 (S420). Specifically, based on the record, the dedicated MME 60D transmits an SRV Query to the DNS server 92 and acquires a Return SRV Record (S430). Moreover, the dedicated MME 60D transmits an A/AAAA Query to the DNS server 92 and acquires a Return A/AAAA Record (S440). The Return A/AAAA Record includes an IP address of a PGW linked with the dedicated network.

(4.5) Operations at Handover of UE 10

Figure 13:
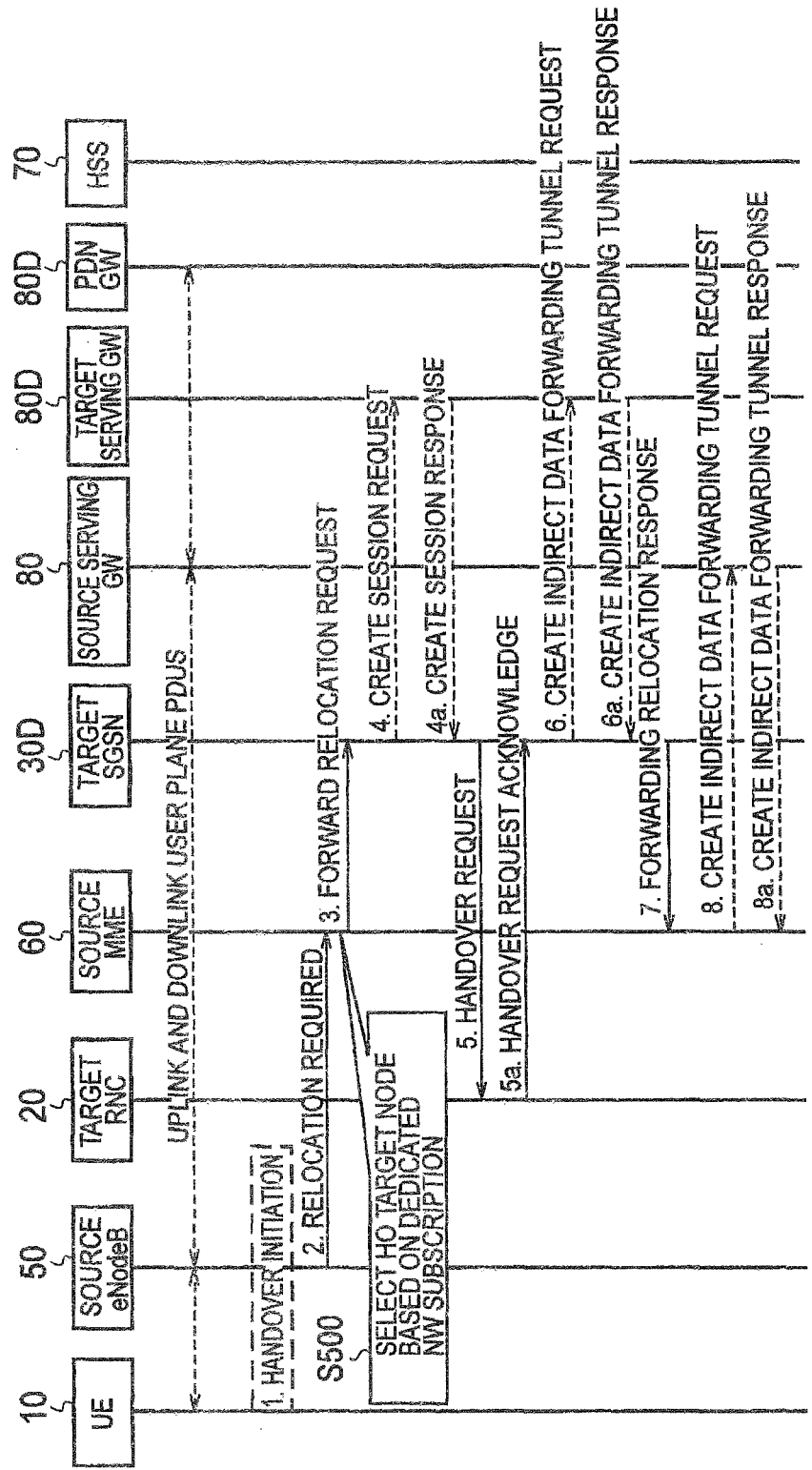
FIG. 13 is a diagram showing a sequence at the time of a handover of the UE 10 according to the first embodiment of the present invention.

FIG. 13 shows a sequence at the time of a handover of the UE 10. Meanwhile, FIG. 14 shows an operation flow at the time of the handover of the UE 10, which is conducted by the dedicated MME 60D.

When a handover between network nodes (dedicated networks) occurs due to the movement of the UE 10, the dedicated MME 60D to which the UE 10 attaches before the handover has to designate a dedicated SGSN corresponding to a handover target. Here, a case in which the UE 10 is handed over from a network node (a dedicated network) of the LTE mode to a network node (a dedicated network) of the 3G mode will be described as an example.

In this case, as shown in FIG. 13, when the subscriber information includes the dedicated network service subscription, the dedicated MME 60D having received a handover request from the eNB 50 (a Source eNodeB) selects a dedicated SGSN and transmits a Forward Relocation Request to a dedicated SGSN 30D thus selected since the handover takes place from the LTE mode to the 3G mode.

Figure 14:
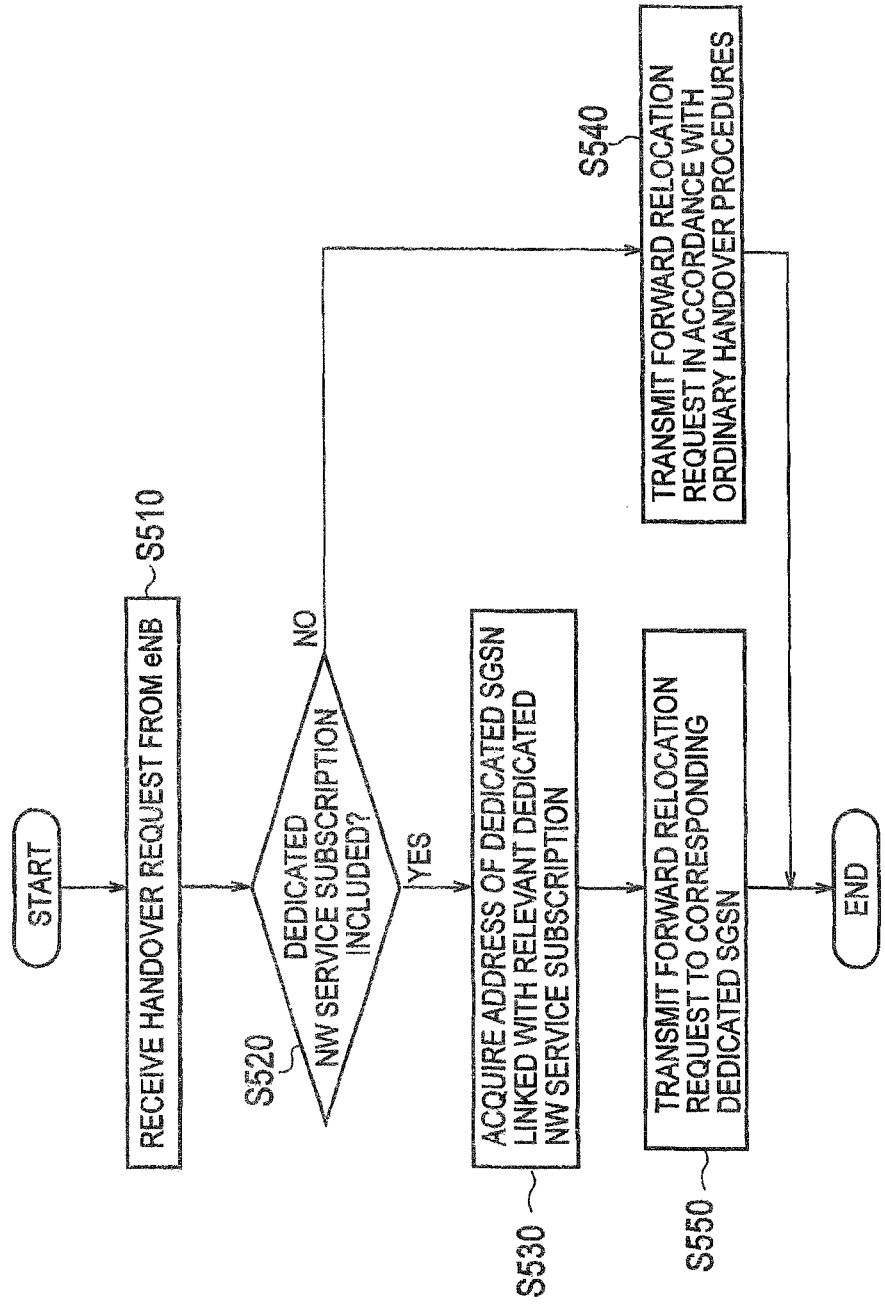
FIG. 14 is a chart showing an operation flow of the dedicated MME 60D at the time of the handover of the UE 10 according to the first embodiment of the present invention.

Specifically, as shown in FIG. 14, when the dedicated MME 60D receives the handover request from the eNB 50 (S510), the dedicated MME 60D determines whether or not the dedicated. network service subscription is included in the handover request, i.e., whether or not the UE 10 is permitted to use the dedicated network (S520).

When the dedicated network service subscription is included, the dedicated MME 60D acquires the address (the IP address) of the dedicated SGSN 30D linked with the dedicated network service subscription (S530). On the other hand, when the dedicated network service subscription is not included (when the use of the dedicated network is not permitted), the dedicated MME 60D transmits the Forward Relocation Request to an SGSN of the handover target instead of the dedicated SGSN 30D in accordance with ordinary handover procedures (S540).

The dedicated MME 60D transmits the Forward Relocation Request to the dedicated SGSN 30D specified by the acquired address (S550).

(4.6) Operations at Change in Subscription by UE 10

Figure 15:
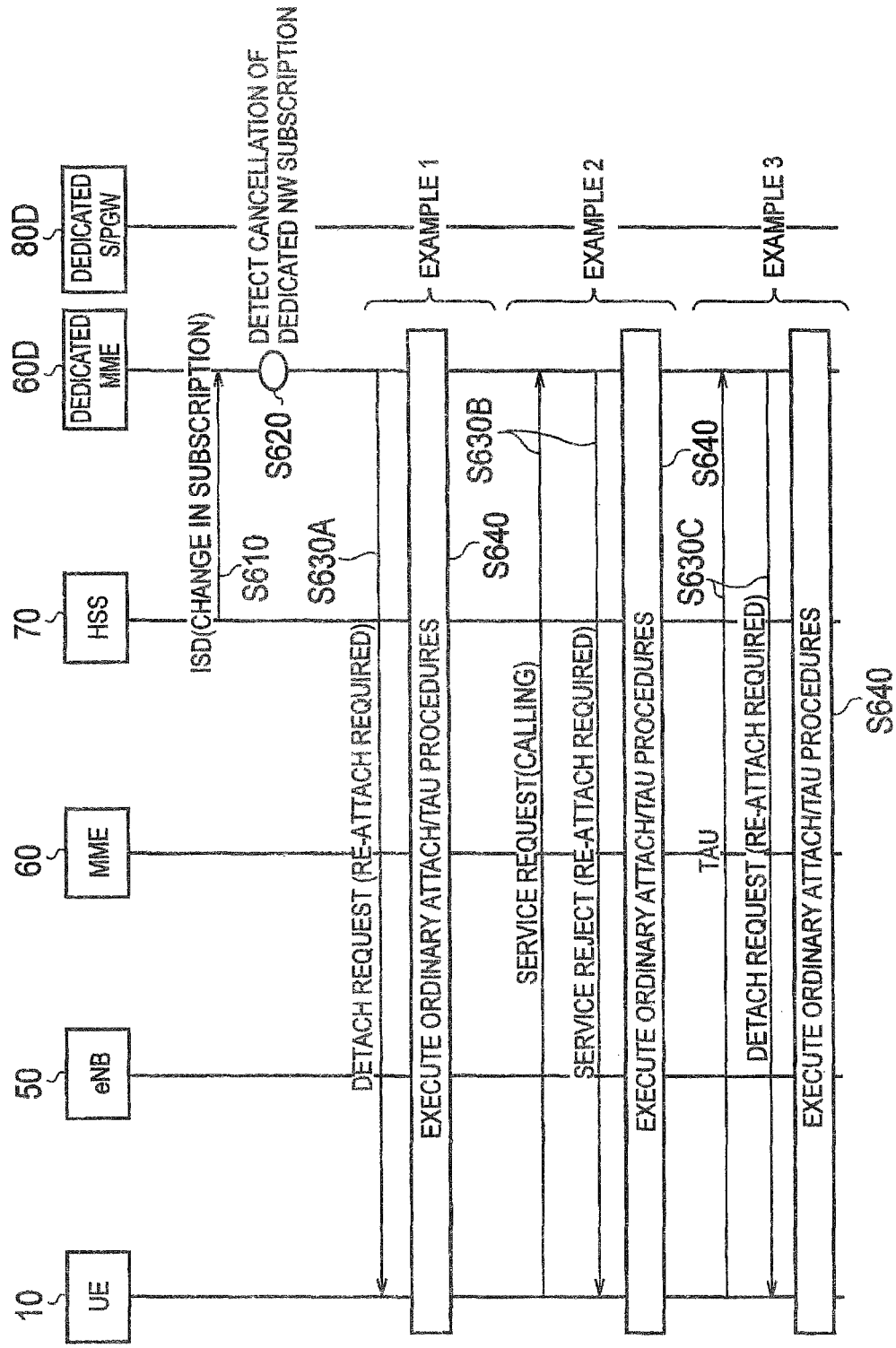
FIG. 15 is a diagram showing a sequence at the time of a change in subscription by the UE 10 according to the first embodiment of the present invention.
Figure 16:
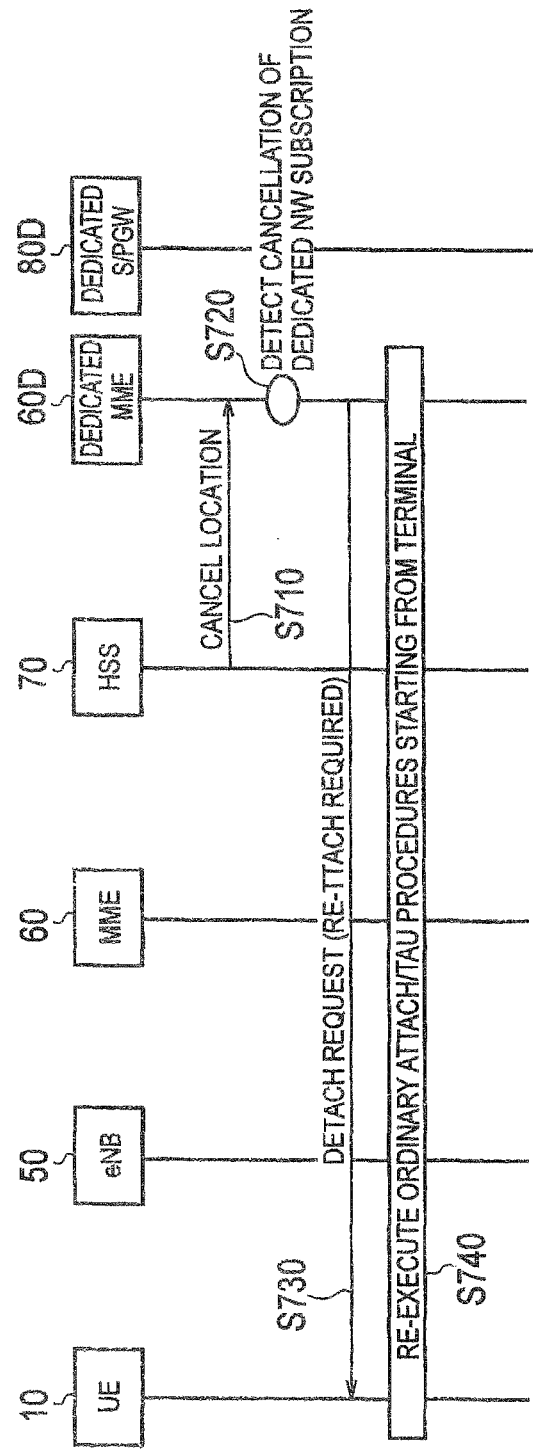
FIG. 16 is a diagram showing the sequence at the time of the change in subscription by the UE 10 according to the first embodiment of the present invention.

FIG. 15 and FIG. 16 show sequences at the time of a change in subscription by the UE 10. Specifically, when the content of the dedicated network service subscription by the UE 10 housed in the dedicated MME 60D is changed, it is necessary to cause the UE 10 to re-attach to a network corresponding to the changed dedicated network service subscription.

FIG. 15 and FIG. 16 show the sequences when the dedicated network service subscription by the UE 10 is changed from being present to being absent. Note that basically similar operations will be executed when the dedicated network service subscription by the UE 10 is changed from being absent to being present.

FIG. 15 shows an example of the sequence (Examples 1 to 3) when the change in the dedicated network service subscription is detected by using the Insert Subscriber Data (ISD). As shown in FIG. 15, the dedicated MME 60D detects cancellation of the dedicated network service subscription by using the ISD (S610, S620). When the dedicated MME 60D detects the cancellation of the dedicated network service subscription, the dedicated MME 60D transmits a Detach Request (Re-attach Required) to the UE 10 (S630A). As a consequence of reception of the Detach Request (Re-attach Required), the UE 10 executes the ordinary Attach/TAU procedures (S640).

Here, the dedicated MME 60D may send the UE 10 a Service Reject (Re-attach Required) instead of the Detach Request (Re-attach Required) (S630B), or may send the UE 10 the Detach Request (Re-attach Required) (S630C) when the dedicated MME 60D receives a TAU from the UE 10.

FIG. 16 shows the sequence when the change in the dedicated network service subscription is detected by using a Cancel Location. As shown in FIG. 16, the dedicated MME 60D detects the cancellation of the dedicated network service subscription by using the Cancellation Location (S710, S720). When the dedicated MME 60D detects the cancellation of the dedicated network service subscription, the dedicated MME 60D transmits the Detach Request (Re-attach Required) to the UE 10 (S730). As a consequence of reception of the Detach Request (Re-attach Required), the UE 10 executes the ordinary Attach/TAU procedures (S740).

(5) Operation and Effects

According to the mobile communication system 1 of the above-described embodiment, the MME 60 acquires from the HSS 70 the subscriber information on the UE 10 including the availability for the UE 10 to use the dedicated network, based on the attachment request (the Attach/TAU Request) from the UE 10 and forwarded by the eNB 50. Then, the MME 60 sends the eNB 50 the selection instruction (the Reroute command) to select the dedicated network based on the acquired subscriber information. When the eNB 50 receives the selection instruction from the MME 60, the eNB 50 determines the dedicated MME 60D constituting the dedicated network, and sends the determined dedicated MME 60D the Initial UE message including the attachment request from the UE 10.

In other words, the eNB 50 can determine the dedicated MME 60D constituting the dedicated network based on the selection instruction from the MME 60. Thus, the eNB 50 can cause the UE of a particular type to attach to the dedicated network regardless of whether or not the UE supports the low access priority indicator (LAPI).

Moreover, in this embodiment, the use of the dedicated network by the UE 10 is determined to be permitted when the LAPI is included in the subscriber information, and the selection instruction is transmitted to the eNB 50. This makes it possible to cause the UE of the particular type to attach to the dedicated network even when the LAPI is used.

Furthermore, in this embodiment, the selection instruction to select the dedicated network linked with the service identifier (the service identification unit S2) is transmitted to the eNB 50 when the service identifier is included in the subscriber information. This makes it possible to cause the UE to attach to the dedicated network corresponding to the type of the service.

In this embodiment, the dedicated MME 60D can determine the UE 10 constituting the dedicated network and linked with the handover target of the UE 10, and forward the handover request to the different dedicated network node thus determined. Thus, it is possible to cause the UE 10 to continuously attach to the dedicated network even after the UE 10 attaching to the dedicated network is handed over due to its movement.

Meanwhile, in this embodiment, the dedicated MME 60D can cancel the attachment of the UE 10 to the dedicated network based on the change information indicating the change in availability to use the dedicated network, and cause the UE 10 to execute the new attachment request. For this reason, the new attachment request is promptly executed when the availability to use the dedicated network is changed. Thus, it is possible to cause the UE 10 to attach to an appropriate network which corresponds to the availability to use the dedicated network.

[Second Embodiment]

Next, a second embodiment of the present invention will be described. The functions and the operations of the mobile communication system of the LTE mode have been described in the first embodiment. Meanwhile, this embodiment will describe functions and operations of a mobile communication system of the 2G/3G mode.

Note that the overall configuration of the mobile communication system of this embodiment is similar to that of the mobile communication system 1 shown in FIG. 1. There is a significant overlap between the functions and the operations of the mobile communication system of the 2G/3G mode and those of the above-described first embodiment. Accordingly, different features from those of the first embodiment will be mainly explained below and explanation of similar portions will be omitted as appropriate.

(1) Outline of Functions Provided by Mobile Communication System

Figure 17:
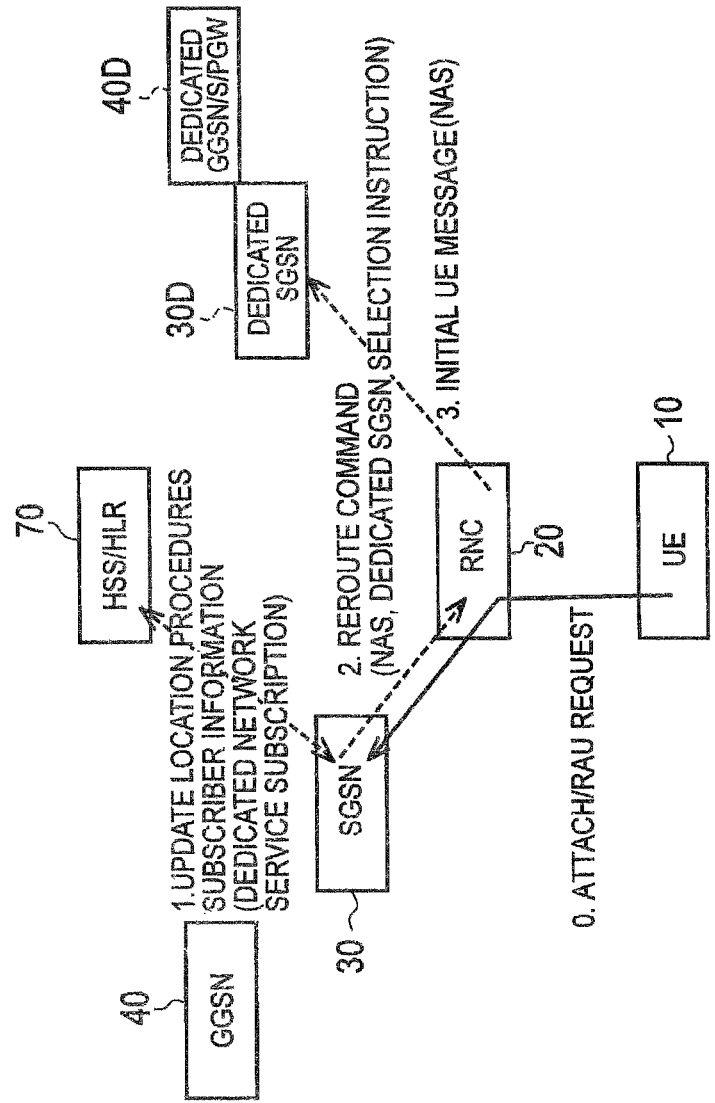
FIG. 17 is an explanatory diagram of an operation outline of a 2G/3G-mode mobile communication system according to a second embodiment of the present invention.

FIG. 17 is an explanatory diagram of an operation outline of the 2G/3G-mode mobile communication system. As shown in FIG. 17, in this embodiment, functions to be provided are realized by the dedicated SGSN 30D and a dedicated GGSN 40D in addition to the RNC 20 and the SGSN 30. Here, the dedicated GGSN 40D may also include the functions of the dedicated S/PGW 80D. That is why this unit is indicated as "dedicated GGSN, S/PGW" in FIG. 17.

The UE 10 executes ordinary Attach/RAU (Routing Area Update) procedures (0. Attach/RAU Request in FIG. 17), and the RNC 20 forwards the Attach/RAU Request to the SGSN 30. Based on the Attach/RAU Request, the SGSN 30 downloads the subscriber information on the UH 10 from the HSS 70 (1. Update Location procedures in FIG. 17).

When the dedicated network service subscription is included in the subscriber information, the SGSN 30 sends the RNC 20, which forwarded the Attach/RAU Request, a Non Access Stratum (NAS) layer signal (2. Reroute command in FIG. 17) that includes a selection instruction to select the dedicated SGSN 30D constituting the dedicated network. Having received the NAS signal, the RNC 20 selects the dedicated SGSN 30D instead of the SGSN 30 based on the Reroute command, and executes the Attach/RAU procedures on the dedicated SGSN 30D. Specifically, the RNC 20 sends the dedicated SGSN 30D the Initial UE message (3. Initial UE message in FIG. 17).

Here, the RNC 20, the SGSN 30, and the dedicated SGSN 30D correspond to the eNB 50, the MME 60, and the dedicated MME 60D of the first embodiment, respectively, and descriptions of their functional block configurations and the like will therefore be omitted.

(2) Operations of Mobile Communication System

Next, operations of the mobile communication system 1 of this embodiment will be described. Specifically, descriptions will be given of (2.1) Attach/RAU Sequence, (2.2) Combined Attach/RAU Sequence, (2.3) Calling Sequence, and Operation Flow of SGSN 30.

(2.1) Attach/RAU Sequence

Figure 18:
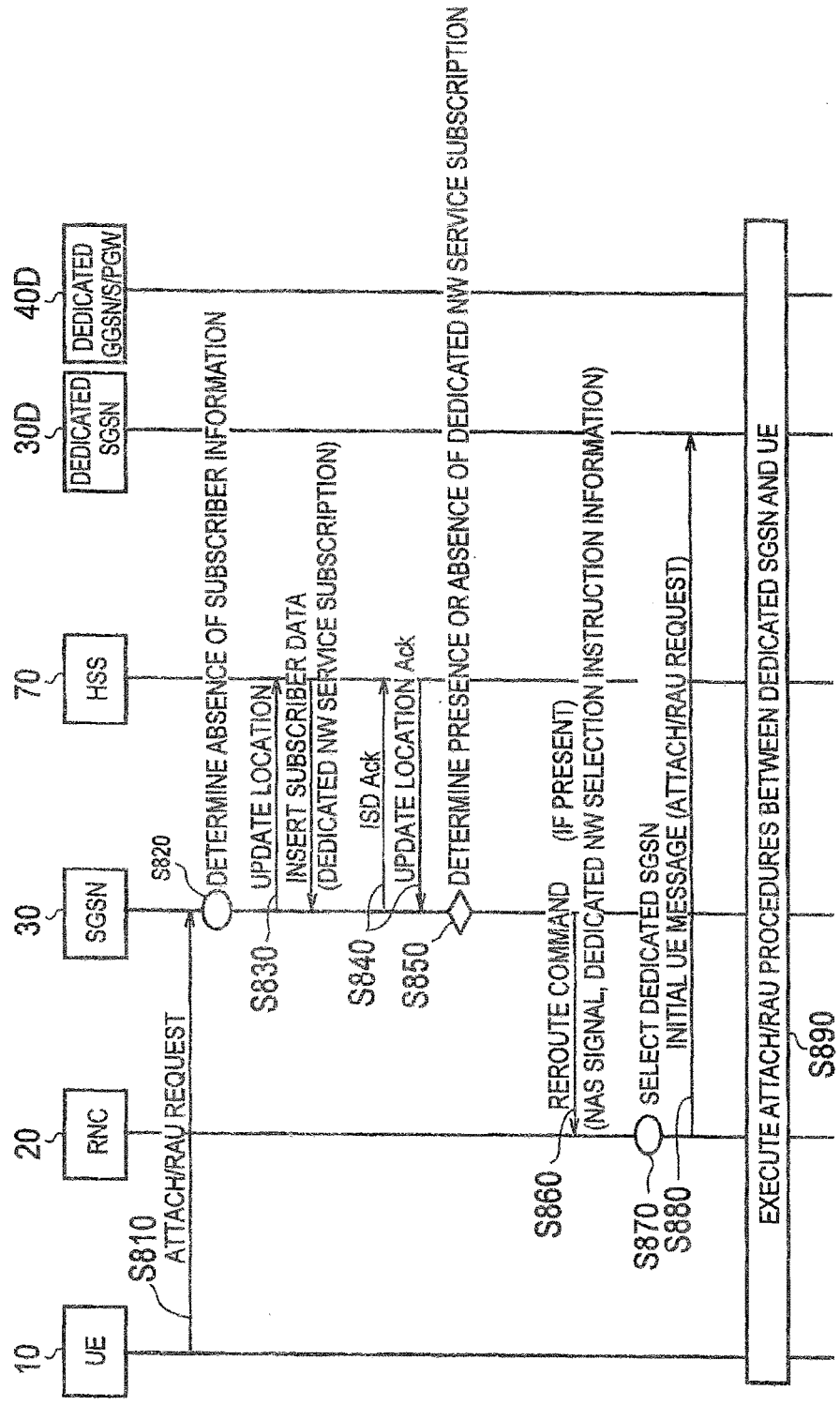
FIG. 18 is a diagram showing an Attach/RAU sequence according to the second embodiment of the present invention.

FIG. 18 shows an Attach/RAU sequence in the mobile communication system 1. As shown in FIG. 18, the UE 10 transmits an RRC signal including the Attach/RAU Request to the SGSN 30 via the RNC 20 (S810). The SGSN 30 determines that the subscriber information on the UE 10 is absent (S820). Accordingly, the SGSN 30 transmits an Update Location to the HSS 70, thereby receiving the Insert Subscriber Data (ISD) from the HSS 70 (S830). Information indicating the presence or absence of the dedicated network service subscription is included in the ISD. In the meantime, the SGSN 30 transmits an ISD Ack to the HSS 70, thereby receiving an Update Location Ack from the HSS 70 (S840).

Based on the ISD, the SGSN 30 determines the presence or absence of the dedicated network service subscription by the UE 10 (S850). When the dedicated network service subscription is present, the SGSN 30 transmits the Reroute command (the selection instruction) to the RNC 20 (S860).

Having received the Reroute command, the RNC 20 selects the dedicated SGSN 30D based on the selection instruction and sends the dedicated SGSN 30D the Initial UE message from the UE 10 (S870, S880).

Having received the Initial UE message, the dedicated SGSN 30D selects the dedicated GGSN 40D constituting the dedicated network, and the dedicated SGSN 30D and the dedicated GGSN 40D execute the Attach/RAU procedures in conjunction with the UE 10 (S890).

(2.2) Combined Attach/RAU Sequence

FIG. 19 shows a combined Attach/RAU sequence in the mobile communication system 1. The combined Attach/RAU sequence is substantially similar to the ordinary Attach/RAU sequence shown in FIG. 18, but is different in that the dedicated MSC/VLR 91D is selected by the dedicated SGSN 30D (S881).

(2.3) Calling Sequence

FIG. 20 shows a calling sequence by the UE 10 in the mobile communication system 1. As shown in FIG. 20, when the Attach/RAU sequence (or the combined Attach/RAU sequence) is completed, the UE 10 executes the calling sequence in conjunction with the dedicated SGSN 30D that the UE 10 attaches to.

Specifically, the UE 10 transmits an Activate PDP Context Request to the dedicated SGSN 30D (S910). Having received the Activate PDP Context Request, the dedicated SGSN 30D selects the dedicated GGSN 40D (or the dedicated S/PGW 80D) (S920). Thereafter, the dedicated SGSN 30D executes the calling procedures in conjunction with the UE 10 (S930).

(2.4) Operation Flow of Dedicated SGSN 30D

FIG. 21 shows an operation flow for the attachment of the UE 10 to the dedicated network, which is conducted by the dedicated SGSN 30D. In FIG. 21, the IP addresses of the dedicated GGSN 40D (and of the dedicated S/PGW 80D) are assumed to be configured in the dedicated SGSN 30D in advance, as with the dedicated MME 60D shown in FIG. 11.

The operations of the dedicated SGSN 30D are substantially similar to those of the dedicated MME 60D. However, in the case of the 2G/3G mode, a calling request signal (the Activate PDP Context Signal) is received from the UE 10 in the above-described calling procedures (S1010).

When dedicated network service subscription is included in subscriber information on a user linked with the UE 10, the dedicated SGSN 30D which has received the calling request signal acquires the addresses (the IP addresses) of the dedicated GGSN 40D and the dedicated S/PGW 80D linked with the dedicated network service subscription (S1020, S1030). On the other hand, when the dedicated network service subscription is not included (when the use of the dedicated network is not permitted), the dedicated SGSN 30D executes ordinary calling procedures (S1040).

The dedicated SGSN 30D executes the calling procedures for the UE 10 on the dedicated GGSN 40D and the dedicated S/PGW 80D specified by the acquired addresses (S1050).

Here, the dedicated SGSN 30D may acquire the IP addresses of the dedicated GGSN 40D and the dedicated S/PGW 80D by using the DNS. In this case, the dedicated SGSN 30D may perform operations similar to those in the sequence for acquiring the IP address shown in FIG. 12.

[Other Embodiments]

As described above, the details of the present invention have been disclosed by using the first embodiment and the second embodiment of the present invention. However, it should not be understood that the description and drawings which constitute part of this disclosure limit the present invention. From this disclosure, various alternative embodiments will be easily found by those skilled in the art.

For example, the functions and the operations of the LTE-mode mobile communication system have been described in the first embodiment of the present invention while the functions and the operations of the 2G/3G-mode mobile communication system have been described in the second embodiment thereof. Accordingly, the present invention is applicable to the systems of the two modes similarly.

Meanwhile, in the above-described first embodiment, the dedicated MME 60D has the functions of the handover processing unit 605, the change information acquisition unit 609, and the attachment cancellation, unit 611. However, these functions are not always necessary.

As described above, the present invention naturally includes various embodiments which are not described herein. Accordingly, the technical scope of the present invention should be determined only by the matters to define the invention in the scope of claims regarded as appropriate based on the description.

The invention mentioned above may be described as follows. In summary, a first aspect of the present invention provides a mobile communication system including: a first network node; a second network node; and a dedicated network node constituting a dedicated network. The first network includes: a subscriber information acquisition unit configured to acquire subscriber information on user equipment from a subscriber server based on an attachment request from the user equipment forwarded by the second network node, the subscriber information including availability for the user equipment to use the dedicated network; and a selection instruction transmission unit configured to send the second network node a selection instruction to select the dedicated network based on the subscriber information acquired by the subscriber information acquisition unit. The second network includes: a selection instruction reception unit configured to receive the selection instruction from the first network node; and a network selection control unit configured to determine the dedicated network node constituting the dedicated network based on the selection instruction received by the selection instruction reception unit, and to transmit the attachment request from the user equipment to the determined dedicated network node.

According to the first aspect of the present invention, the subscriber information includes a low priority identifier indicating that the user equipment has a lower priority than a priority of other user equipment. When the subscriber information includes the low priority identifier, the selection instruction transmission unit determines that use of the dedicated network is permitted and transmits the selection instruction to the second network node.

According to the first aspect of the present invention, the subscriber information includes a service identifier indicating a type of a service to be used by the user equipment, and the selection instruction transmission unit sends the second network node the selection instruction to select the dedicated network linked with the service identifier, based on the service identifier included in the subscriber information.

According to the first aspect of the present invention, the dedicated network node includes a handover processing unit configured, when the dedicated network node receives a handover request for the user equipment from the second network node and if the user equipment is permitted to use the dedicated network, to determine a different dedicated network node constituting the dedicated network and linked with a handover target of the user equipment, and to forward the handover request to the determined different dedicated network node.

According to the first aspect of the present invention, the dedicated network node includes: a change information acquisition unit configured to acquire from the subscriber server change information indicating a change in availability for the user equipment to use the dedicated network; and an attachment cancellation unit configured to cancel attachment of the user equipment to the dedicated network based on the change information acquired by the change information acquisition unit, and to cause the user equipment to execute a new attachment request.

In summary, a second aspect of the present invention provides a network node constituting a mobile communication system, including: a subscriber information acquisition unit configured to acquire subscriber information on user equipment from a subscriber server based on an attachment request from the user equipment forwarded by a different network node, the subscriber information including availability for the user equipment to use a dedicated network; and a selection instruction transmission unit configured to send the different network node a selection instruction to select the dedicated network based on, the subscriber information acquired by the subscriber information acquisition unit.

In summary, a third aspect of the present invention provides a network node constituting a mobile communication system, including: a selection instruction reception unit configured to receive from a different network node a selection instruction to select a dedicated network by user equipment; and a network selection control unit configured to determine a dedicated network node constituting the dedicated network based on the selection instruction received by the selection instruction reception unit, and to transmit an attachment request from the user equipment to the determined dedicated network node.

In summary, a fourth aspect of the present invention provides a mobile communication method to be implemented by a first network node, a second network node, and a dedicated network node constituting a dedicated network, the method comprising the steps of: causing the first network node to acquire subscriber information on user equipment from a subscriber server based on an attachment request from the user equipment forwarded by the second network node, the subscriber information including availability for the user equipment to use the dedicated network; causing the first network node to send the second network node a selection instruction to select the dedicated network based on the acquired subscriber information; causing the second network node to receive the selection instruction from the first network node; and causing the first network node to determine the dedicated network node constituting the dedicated network based on the received selection instruction, and to transmit an attachment request from the user equipment to the determined dedicated network node.

Note that the entire content of Japanese Patent Application No. 2013-190542 (filed on Sep. 13, 2013) is incorporated herein by reference in the present specification.

INDUSTRIAL APPLICABILITY

According to the features of the present invention, it is possible to provide a mobile communication system, a network node, and a mobile communication method, which can cause user equipment of a particular type to attach to a dedicated network regardless of whether or not the UE supports a low access priority indicator (LAPI).

EXPLANATION OF THE REFERENCE NUMERALS 1 mobile communication system
10 UE
20 RNC
30 SGSN
30D dedicated SGSN
40 GGSN
40D dedicated GGSN
50 eNB
51 selection instruction reception unit
53 network selection control unit
60 MME
60D dedicated MME
61 subscriber information acquisition unit
63 network information storage unit
65 selection instruction transmission unit
67 DNS processing unit
70 HSS
80 S/PGW
80D dedicated S/PGW
91D dedicated MSC/VLR
92 DNS server
601 attachment request reception unit
603 attachment request processing unit
605 handover processing unit
607 network information storage unit
609 change information acquisition unit
611 attachment cancellation unit

The invention claimed is:
1. A mobile communication system comprising:
a first network node;
a second network node; and
a dedicated network node comprised in a dedicated network, wherein
the first network node includes:
 a first processor coupled to a first receiver and a first transmitter, wherein
 the first receiver is configured to acquire subscriber information on user equipment from a subscriber server based on an attachment request from the user equipment forwarded by the second network node, the subscriber information including availability for the user equipment to use the dedicated network, and
 the first transmitter is configured to send the second network node a selection instruction to select the dedicated network based on the subscriber information acquired by the first receiver,
the second network node includes:
 a second processor coupled to a second receiver and a second transmitter, wherein
 the second receiver is configured to receive the selection instruction from the first network node, and
 the second processor is configured to determine the dedicated network node comprised in the dedicated network based on the selection instruction received by the second receiver, and
 the second transmitter is configured to transmit the attachment request from the user equipment to the determined dedicated network node, and the dedicated network node includes:
a third processor coupled to a third receiver and a third transmitter, wherein
the third processor is configured, when the dedicated network node receives a handover request for the user equipment from the second network node and if the user equipment is permitted to use the dedicated network, to determine a different dedicated network node comprised in the dedicated network and linked with a handover target of the user equipment, and
the third transmitter is configured to forward the handover request to the determined different dedicated network node.

2. The mobile communication system according to claim 1, wherein
the subscriber information includes a low priority identifier indicating that the user equipment has a lower priority than a priority of other user equipment, and
when the subscriber information includes the low priority identifier, the first processor determines that use of the dedicated network is permitted and the first transmitter transmits the selection instruction to the second network node.

3. The mobile communication system according to claim 1, wherein
the subscriber information includes a service identifier indicating a type of a service to be used by the user equipment, and
the first transmitter sends the second network node the selection instruction to select the dedicated network linked with the service identifier, based on the service identifier included in the subscriber information.

4. The mobile communication system according to claim 1, wherein the dedicated network node includes:
the third receiver configured to acquire from the subscriber server change information indicating a change in availability for the user equipment to use the dedicated network; and
the third processor configured to cancel attachment of the user equipment to the dedicated network based on the change information acquired by the third receiver, and the third processor causes the user equipment to execute a new attachment request.

5. A mobile communication method to be implemented by a first network node, a second network node, and a dedicated network node comprised in a dedicated network, the method comprising the steps of:
causing the first network node to acquire subscriber information on user equipment from a subscriber server based on an attachment request from the user equipment forwarded by the second network node, the subscriber information including availability for the user equipment to use the dedicated network;
causing the first network node to send the second network node a selection instruction to select the dedicated network based on the acquired subscriber information;
causing the second network node to receive the selection instruction from the first network node; and
causing the first network node to determine the dedicated network node comprised in the dedicated network based on the received selection instruction, and to transmit an attachment request from the user equipment to the determined dedicated network node,
wherein the dedicated network node, when the dedicated network node receives a handover request for the user equipment from the second network node and if the user equipment is permitted to use the dedicated network, determines a different dedicated network node comprised in the dedicated network and linked with a handover target of the user equipment, and forwards the handover request to the determined different dedicated network node.

* * * * *